United States Patent
Yajima

(10) Patent No.: US 7,302,641 B1
(45) Date of Patent: Nov. 27, 2007

(54) INFORMATION PROCESSING METHOD AND APPARATUS FOR MAKING DOCUMENT

(76) Inventor: Mantaro Yajima, 521 Jike, Saijocho, Higashihiroshima-shi, Hiroshima-ken (JP)

( * ) Notice: Subject to any disclaimer, the term of this patent is extended or adjusted under 35 U.S.C. 154(b) by 0 days.

(21) Appl. No.: 09/453,214

(22) Filed: Dec. 3, 1999

(51) Int. Cl.
*G06F 17/00* (2006.01)

(52) U.S. Cl. .................................... 715/541

(58) Field of Classification Search ............... 715/541, 715/526, 532, 542, 530
See application file for complete search history.

(56) References Cited

U.S. PATENT DOCUMENTS

| | | | | |
|---|---|---|---|---|
| 5,590,257 A | * | 12/1996 | Forcier ..................... | 715/530 |
| 5,655,136 A | * | 8/1997 | Morgan ..................... | 382/187 |
| 5,666,139 A | * | 9/1997 | Thielens et al. ............ | 345/173 |
| 5,781,662 A | * | 7/1998 | Mori et al. ................ | 382/189 |
| 5,798,758 A | * | 8/1998 | Harada et al. ............. | 345/863 |
| 5,848,187 A | * | 12/1998 | Bricklin et al. ............ | 382/187 |
| 5,880,743 A | * | 3/1999 | Moran et al. .............. | 345/473 |
| 5,913,221 A | * | 6/1999 | Kano et al. ................ | 715/530 |

OTHER PUBLICATIONS

Mosely, Lonnie E. and Boodey, David M. "Mastering Microsoft Office 97, Professional Edition" Second Edition 1996, p. 156-7.*

* cited by examiner

*Primary Examiner*—Stephen S. Hong
*Assistant Examiner*—Adam M. Queler
(74) *Attorney, Agent, or Firm*—Wenderoth, Lind & Ponack, L.L.P.

(57) ABSTRACT

An operator is allowed to provide desired data definitions, file definitions and application definitions by entering familiar characters symbols and/or graphicals in a document. Having created a data item descriptor chain, a system recognizes a group of data item names in the respective item descriptors constructing the chain. When it has been found that a recognized data item, say, "data item name", "type", "master name" or "synonym" has been registered as pertaining to a descriptor group of "define data", the system operates to create a data definition descriptor, thus creating data definition descriptors which specify data names and their attributes according to descriptors entered in a data definition sheet.

13 Claims, 52 Drawing Sheets

FIG. 5

[DESCRIPTOR ELEMENTS / WRITTEN SIGNS] PART 1

| DESCRIPTOR GROUP | DESCRIPTOR ELEMENT | WRITTEN BY |
|---|---|---|
| COMMON | LINK | ——— |
| | DESIGNATE DECRIPTOR ELEMENT | ⬭ , ▨ |
| | DESIGNATE DOMAIN | ⌐ ⌐ , [ ] |
| | DATA ITEM | < > , ▨ |
| | DATA VALUE | ——— |
| | FIELD | ▭ , ▨ |
| | EXCLUDE | { } |
| | SORT | |
| | INCREASING | ↑ |
| | DECREASING | ↓ |
| | DESIGNATE OBJECT | ⌵ |
| | ⋮ | ⋮ |

FIG.6

[DESCRIPTOR ELEMENTS / WRITTEN SIGNS] PART 2

| DESCRIPTOR GROUP | DESCRIPTOR ELEMENT | WRITTEN BY |
|---|---|---|
| MANAGE DATA | EFECTIVE FIGURES | NUMERIC FIGURES |
| | ROUNDING | ROUND UP |
| | | ROUND DOWN |
| | | ROUND OFF |
| | . | . |
| | . | . |
| | . | . |
| DEFINE DATA | DATA ITEM NAME | |
| | TYPE | TYPE, NUMERIC/TEXT TYPE |
| | NUMERIC | NUMERIC |
| | TEXT | TEXT, CHARACTER STRINGS |
| | SUM NUMERIC | SUM NUMERIC |
| | MASTER NAME | MASTER NAME |
| | SYNONYM | SYNONYM, INTERCHANGE |
| | DEFINE DATA | DEFINE DATA |
| | . | . |
| | . | . |
| | . | . |

FIG.7

[DESCRIPTOR ELEMENTS / WRITTEN SIGNS] PART 3

| DESCRIPTOR GROUP | DESCRIPTOR ELEMENT | WRITTEN BY |
|---|---|---|
| DEFINE FILE | FILE NAME | FILE NAME, FILE ID |
| | DATA ITEM NAME | DATA ITEM |
| | FIELD NAME | FIELD NAME, ACCESS NAME |
| | FIELD LENGTH | FIELD LENGTH |
| | DEFINE FILE | DEFINE FILE |
| | ⋮ | ⋮ |
| DEFINE COMMAND/ PROCEDURE | OUTPUT DATA | OUTPUT |
| | PRINT | PRINT |
| | SEND FAX | FAX, FACSIMILE |
| | SAVE | SAVE, KEEP |
| | LOAD | LOAD, GET |
| | ⋮ | ⋮ |
| | SENDER | FROM |
| | RECEIVER | TO |
| | ⋮ | ⋮ |

FIG.8

[ DESCRIPTOR ELEMENTS / WRITTEN SIGNS ] PART 4

| DESCRIPTOR GROUP | DESCRIPTOR ELEMENT | WRITTEN BY |
|---|---|---|
| FORMAT DOCUMENT | CENTERING | C, CENTERING |
| | RIGHT JUSTIFICATION | R, RJ, JUSTIFY |
| | TAB | ▽ |
| | LEFT MARGIN | ] |
| | RIGHT MARGIN | [ |
| | FIX | △ |
| | CHARACTER SIZE | P |
| | ⋮ | ⋮ |
| EDIT DOCUMENT | INSERT | ∨ |
| | COPY | ↙ |
| | DELET | = |
| | ⋮ | ⋮ |

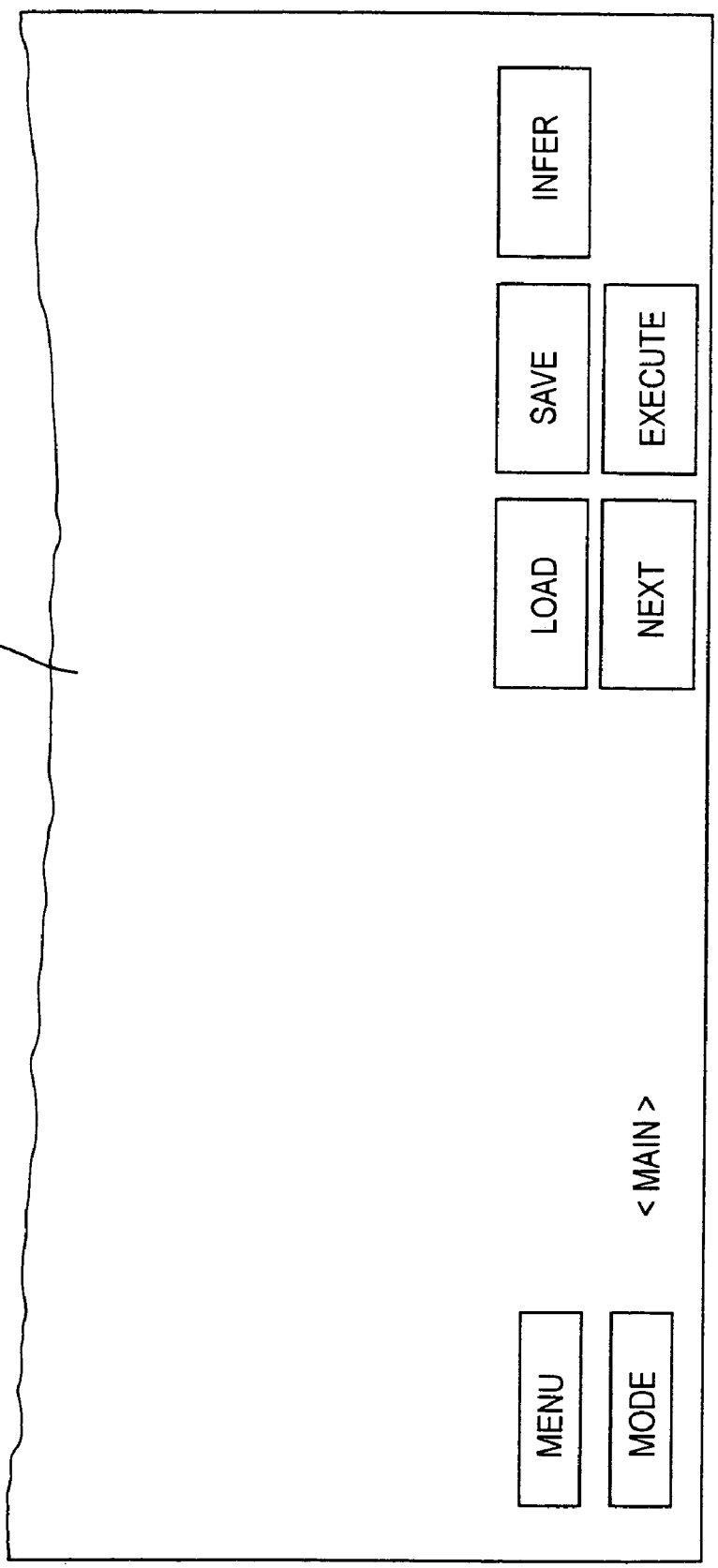

FIG.13    DATA DEFENITION

| DATA ITEM NAME | TYPE | MASTER NAME | SYNONYM |
|---|---|---|---|
| CLASS | TEXT | ARTICLE CLASS MASTER | ARTICLE CLASS |
| ARTICLE CODE | TEXT | ARTICLE CODE MASTER | |
| SALES | SUM NUMERIC | | REVENUE, INCOME |
| UNIT PRICE | NUMERIC | | PRICE |
| BRANCH OFFICE | TEXT | BRANCH OFFICE MANAGEMENT MASTER | BRANCH OFFICE NAME |
| MONTH | TEXT | | |
| SALES QUANTITY | SUM NUMERIC | | |

FIG.21 [CHARACTER STRING RECORD]

FIG.28
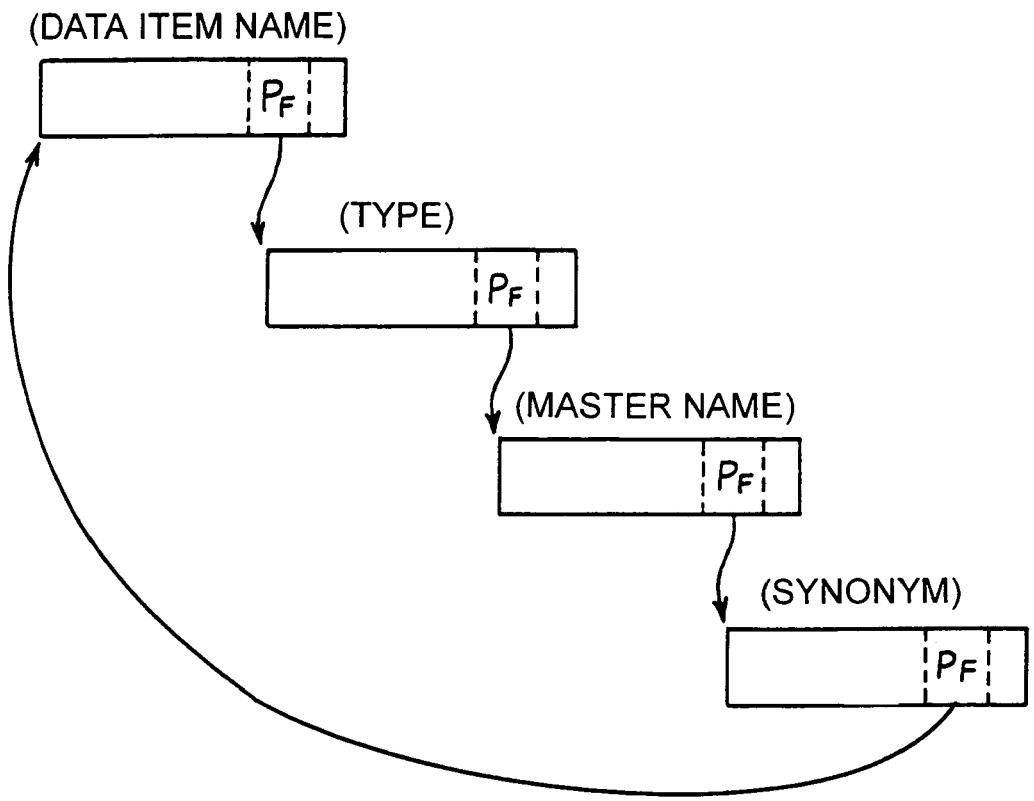
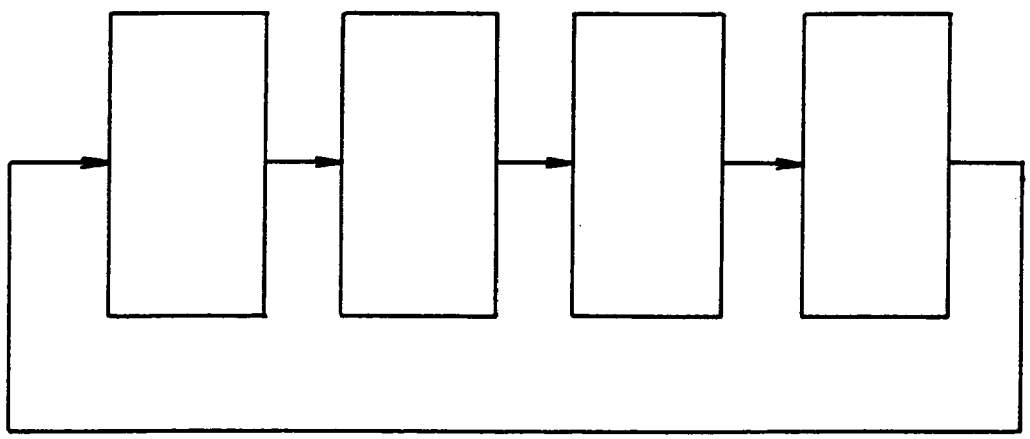

FIG.30
[ CELL DESCRIPTOR CHAIN IN FIELD ]
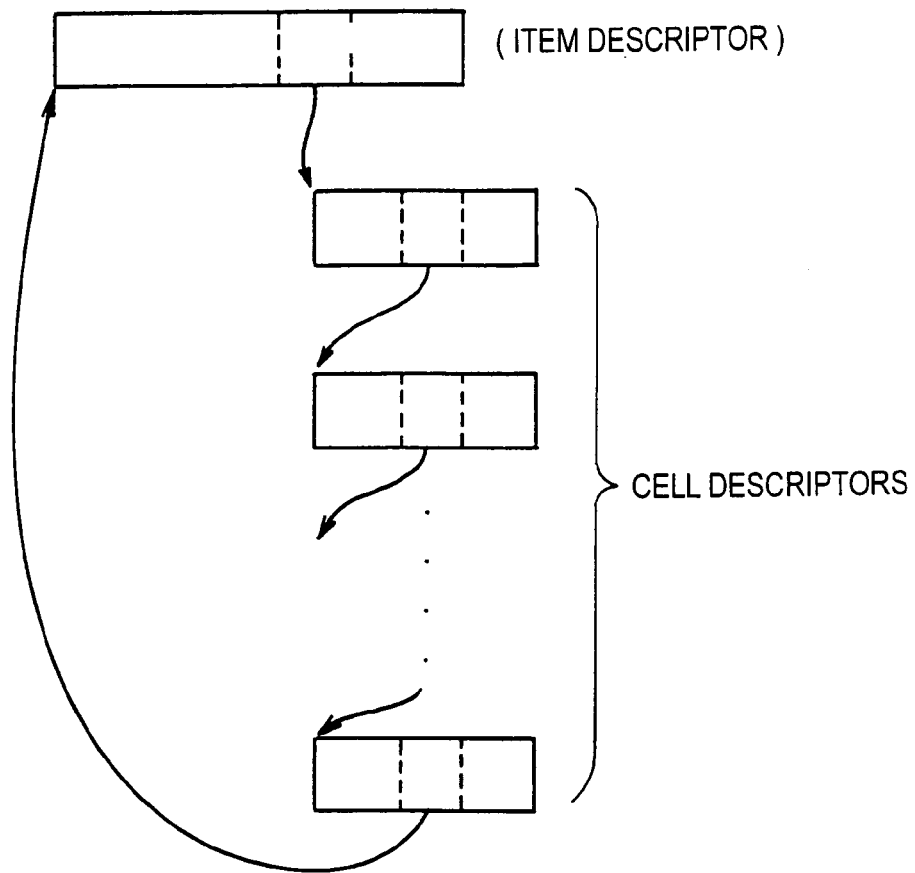
( ITEM DESCRIPTOR )
CELL DESCRIPTORS
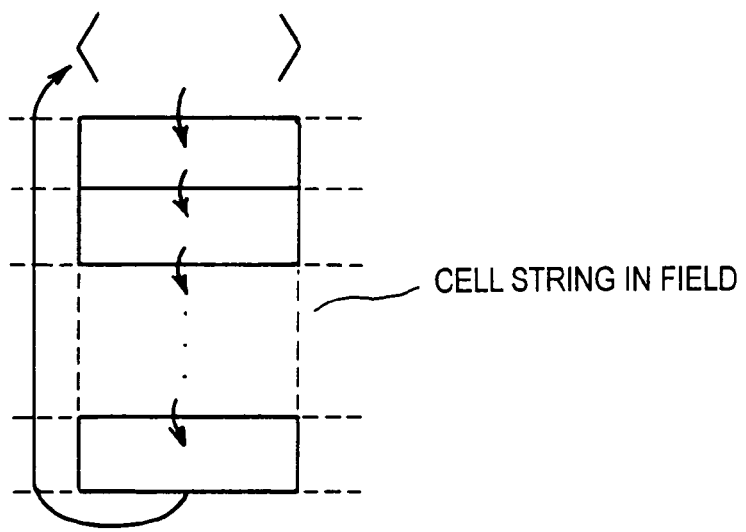
CELL STRING IN FIELD FIG.31 [CELL DESCRIPTOR CHAIN IN RECORD]
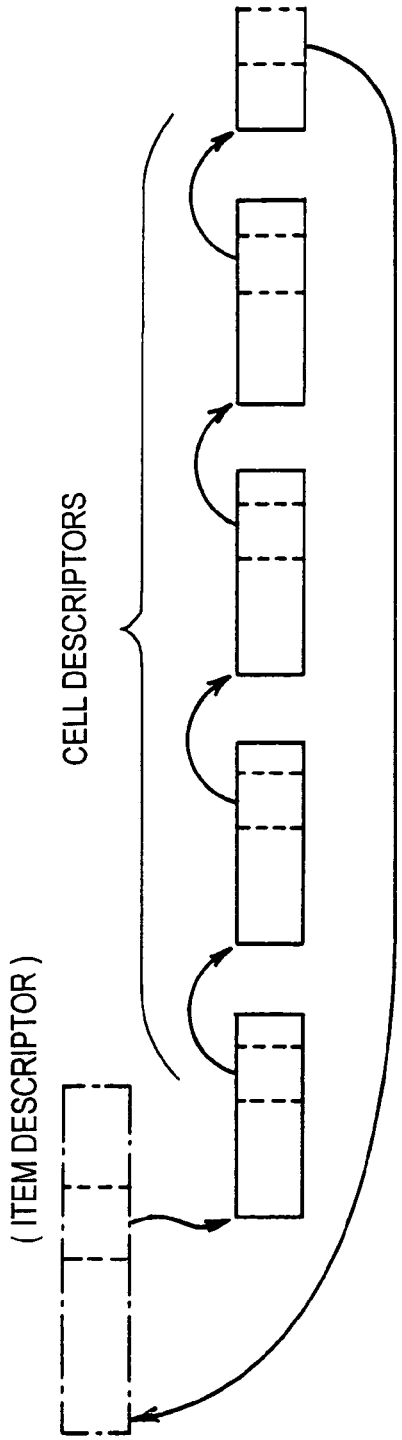
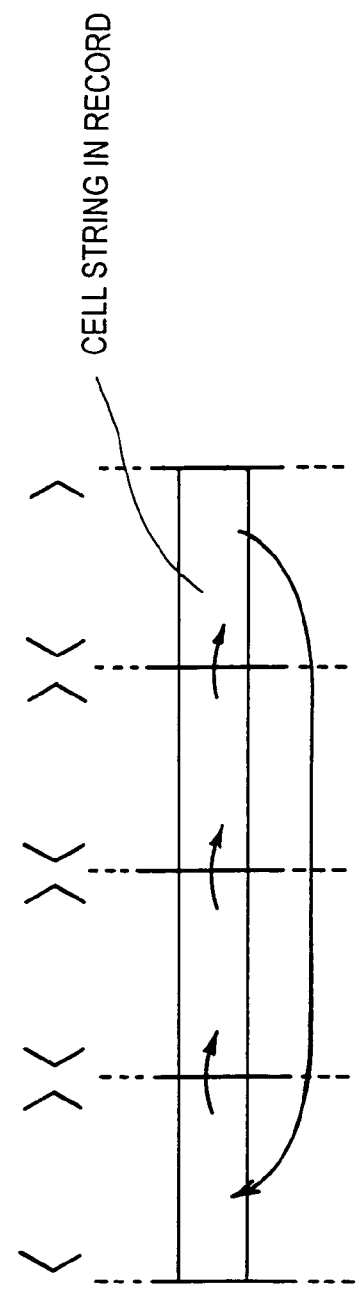

FIG.33 [DATA DEFINITION DESCRIPTOR]

FIG.34

SALES BY MONTHS

| MONTH | CLASS | ARTICLE CODE | UNIT PRICE | SALES QUANTITY |
|---|---|---|---|---|
| MON | BUN | HIN | TAN | SUU |
| 5 | 20 | 20 | 5 | 5 |

FIG.36
[ ITEM DESCRIPTOR CHAIN ]
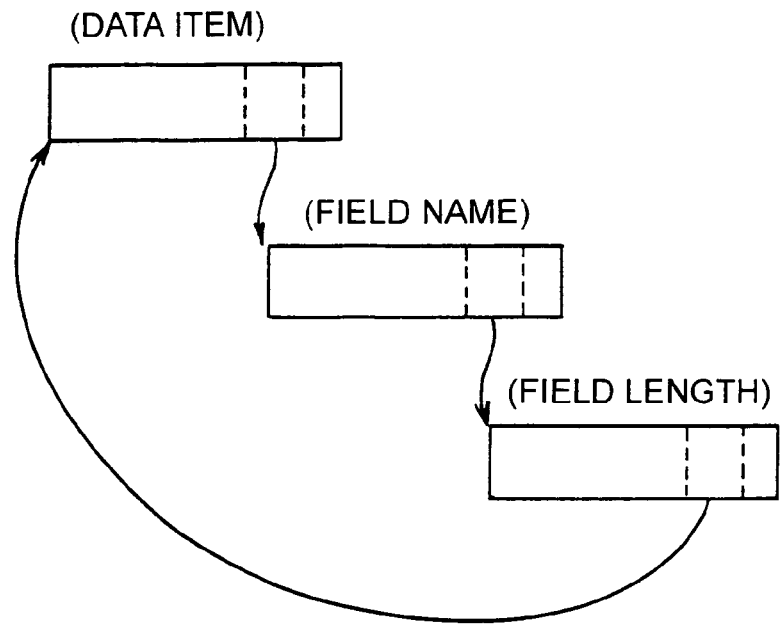
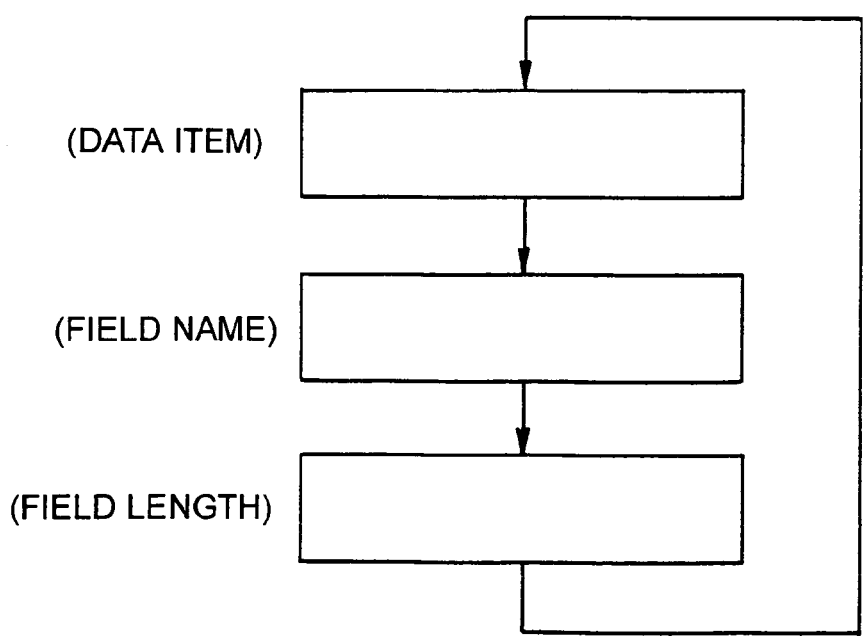

FIG.38
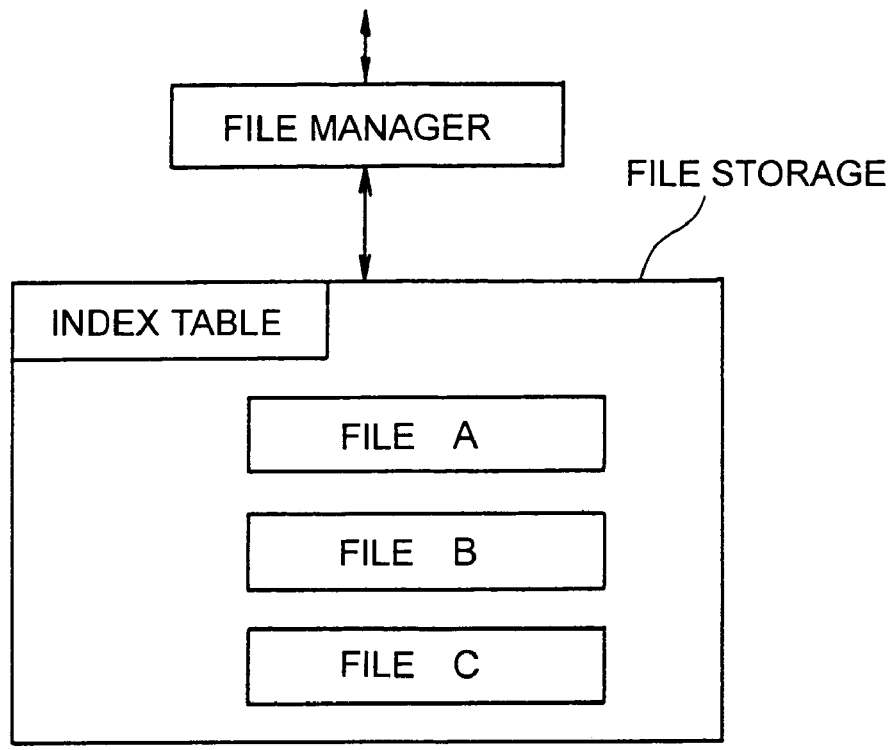
(INDEX TABLE)
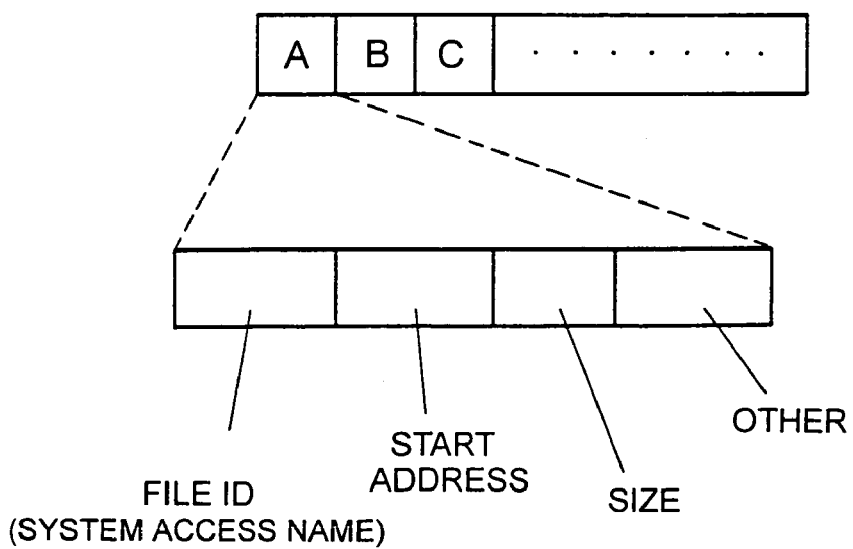

FIG.39

SALES BY MONTHS

KANDA BRANCH OFFICE

1995

| ARTICLE NAME | | SALES QUANTITY | UNIT PRICE | SALES |
|---|---|---|---|---|
| TV SET | J1020 | | | |
| TV SET | J1050 | | | |
| TV SET | J1010 | | | |
| RADIO RECEIVER | V5030 | | | |
| RADIO RECEIVER | V5070 | | | |
| RADIO RECEIVER | V5040 | | | |
| CAR NAVIGATION SYSTEM | S8010 | | | |
| CAR NAVIGATION SYSTEM | S8020 | | | |
| CAR NAVIGATION SYSTEM | S8080 | | | |

SALES = UNIT PRICE × SALES QUANTITY (NOTE) OUTPUT FROM SALES BY MONTHS FILE

FIG.40   SALES BY MONTHS

{CLASS} (BLUE) {ARTICLE CODE} (BLUE) {SALES QUANTITY} (BLUE) {UNIT PRICE} (BLUE) {SALES} (BLUE) {KANDA BRANCH OFFICE} (BLUE) 1995 {MONTH} (BLUE)

| ARTICLE NAME | | | | |
|---|---|---|---|---|
| TV SET | J1020 | | | |
| TV SET | J1050 | | | |
| TV SET | J1010 | | | |
| RADIO RECEIVER | V5030 | | | |
| RADIO RECEIVER | V5070 | | | |
| RADIO RECEIVER | V5040 | | | |
| CAR NAVIGATION SYSTEM | S8010 | | | |
| CAR NAVIGATION SYSTEM | S8020 | | | |
| CAR NAVIGATION SYSTEM | S8080 | | | |

(NOTE) OUTPUT FROM {SALES BY MONTHS FILE} (BLUE)

{SALES} = {UNIT PRICE} × {SALES QUANTITY} (BLUE)

FIG.41
[ ITEM DESCRIPTOR CHAIN ]
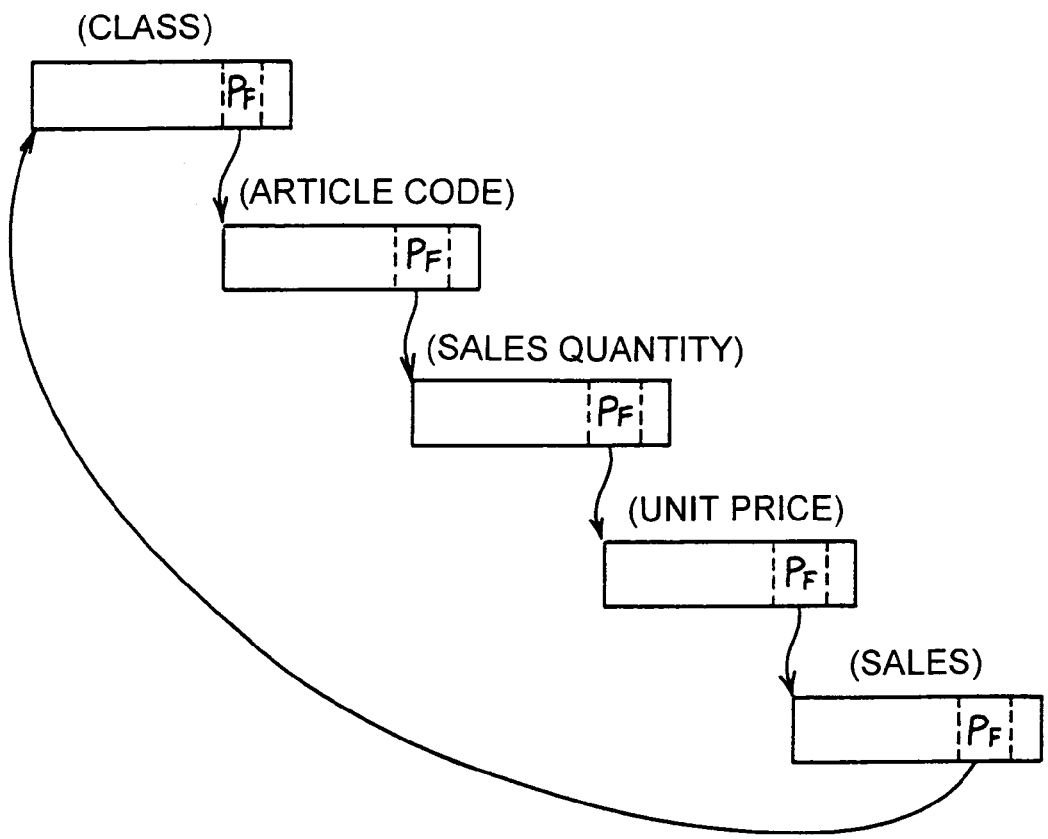
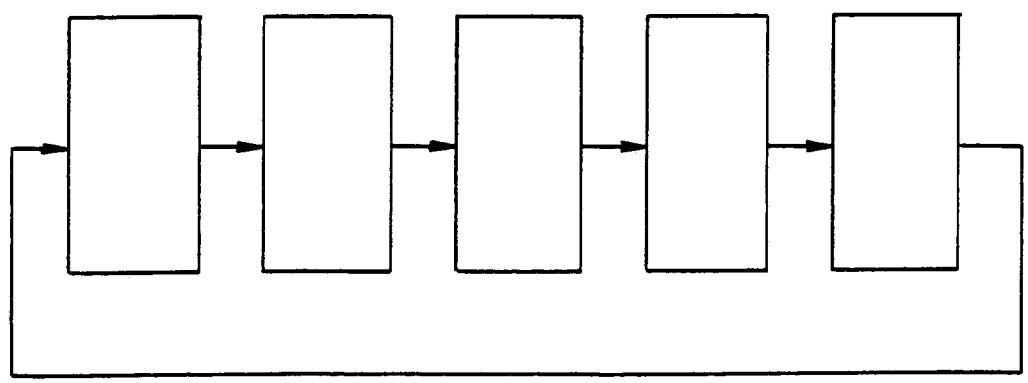

FIG.43

[ APPLICATION DICTIONARY ]

| ENTRY GROUP | ENTRIES |
|---|---|
| UNIT | km, m, cm, mm <br> M UNITS, N UNITS <br> M YENS, M¥, K YENS, K¥, YEN, ¥,··· <br> M DOLLARS, M$, K DOLLARS, K$, <br> DOLLAR, $,··· |
| ARITHMETIC | =, ×, +, ÷, /, ··· |
| SUM | Σ, SUM, TOTAL, GROSS, ··· |

FIG.44 [ DICTIONARY ENTRY ]

FIG.50
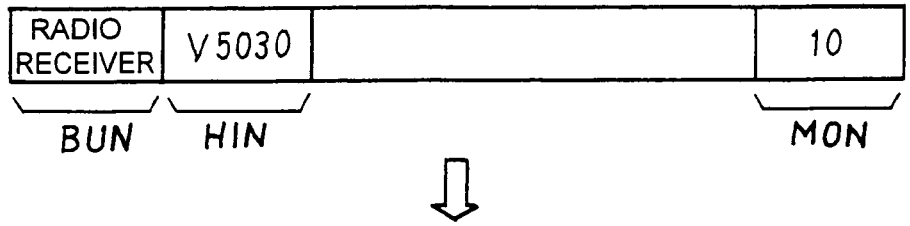
FIG.51
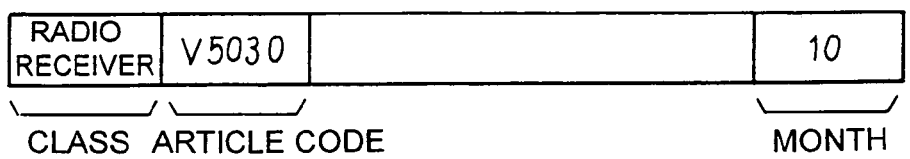

FIG.52

KANDA BRANCH OFFICE

SALES BY MONTHS

1995

| ARTICLE | NAME | SALES QUANTITY | UNIT PRICE | SALES |
|---|---|---|---|---|
| TV SET | J1020 | 396 | 73200 | 28987200 |
| TV SET | J1050 | 456 | 68700 | 31295200 |
| TV SET | J1010 | 238 | 98600 | 23466800 |
| RADIO RECEIVER | V5030 | 815 | 12500 | 10187500 |
| RADIO RECEIVER | V5070 | 292 | 24500 | 7155800 |
| RADIO RECEIVER | V5040 | ⋮ | ⋮ | ⋮ |
| CAR NAVIGATION SYSTEM | S8010 | ⋮ | ⋮ | ⋮ |
| CAR NAVIGATION SYSTEM | S8020 | ⋮ | ⋮ | ⋮ |
| CAR NAVIGATION SYSTEM | S8080 | | | |

SALES = UNIT PRICE × SALES QUANTITY (NOTE) OUTPUT FROM SALES BY MONTHS FILE

FIG.54

DATA DEFINITION (BLUE)

| ⟨DATA ITEM NAME⟩ (BLUE) | ⟨TYPE⟩ (BLUE) | ⟨MASTER NAME⟩ (BLUE) | ⟨SYNONYM⟩ (BLUE) |
|---|---|---|---|
| CLASS | TEXT | ARTICLE CLASS MASTER | ARTICLE CLASS |
| ARTICLE CODE | TEXT (BLUE) | ARTICLE CODE MASTER | (BLUE) |
| SALES | SUM NUMERIC | | REVENUE, INCOME |
| UNIT PRICE | NUMERIC | | PRICE |
| BRANCH OFFICE | TEXT | BRANCH OFFICE MANAGEMENT MASTER | BRANCH OFFICE NAME |
| MONTH | TEXT | | |
| SALES QUANTITY | SUM NUMERIC | | |

(BLUE) (BLUE) (BLUE) (BLUE)

INFORMATION PROCESSING METHOD AND APPARATUS FOR MAKING DOCUMENT

BACKGROUND OF THE INVENTION

1. Field of the Invention

The present invention relates to an information processing method and apparatus which processes and manages documents and data.

2. Prior Art

To construct an application system, an information processing apparatus (computer-based system) has to define and register data involved in the application and their attributes. To provide individual databases or files in the system, registration of file attributes (file name, field name, record length, etc.) is required.

For such data and file definitions, the prior art uses a dedicated program which allows a system operator to enter requirements for the specification or definition of the data or files into a selected area on a display screen presented by the dedicated program.

In an application, a document is made as follows. Ruled lines and character strings are entered into a screen by keyboard or mouse operations. Each entered data is recognized as the one defining a document feature. A format of the document is determined on the basis of the entered data.

In another application, when ruled lines of a table are entered in a screen and a desired field (area) of the table is selected by a mouse operation or the like, a sub-screen of a list of attributes and definition items of the field appears. Selecting a desired item in the list causes the system to define (set) a format of the field by the selected item.

In another application, a command definition is made by using a keyboard or a button on a screen to enter a special command according to a predetermined language (e.g., Visual Basic).

The prior art "data definition" or "file definition" has disadvantages as follows. It requires a large dedicated program. Setting operations are complicated and troublesome. Furthermore, freedom of definition for the forms and contents is limited.

The prior art document making and command defining feature requires users to learn a large number of manual operations and procedures, thus greatly limiting the available definition contents.

SUMMARY OF THE INVENTION

In view of the prior art problems, an object of the invention is to provide an information processing method and apparatus which can readily define desired data or files by a simple writing operation.

Another object of the invention is to provide an information processing method and apparatus which can readily define desired data or files by writing familiar characters, symbols and/or graphicals (graphical elements) in a document.

Another object of the invention is to provide an information processing method and apparatus which can define a data file or application (e.g., document making) by using common written signs for their definition.

Another object of the invention is to provide an information processing method and apparatus which can define various commands by a simple operation involving very few matters which must be learned by users.

In order to achieve the above-described objects, a first information processing apparatus of the present invention comprises written signs entering means for entering written signs in the form of characters, symbols and/or graphicals in a sheet or electronic document and, first descriptor recognizing means for recognizing a descriptor in the written signs entered by the written sign entering means. The first information processing apparatus also comprises second descriptor recognizing means for recognizing a composite descriptor on the basis of a plurality of the recognized descriptors corresponding to a plurality of the entered written signs having an association with one another according to predetermined association rules. The first information processing apparatus further comprises determining means, which are responsive when the second descriptor recognizing means has recognized the composite descriptor that provides an association between a desired data item name and a desired area of the document, for determining whether the data item name has been registered in a predetermined dictionary. The first information processing apparatus further comprises descriptor data creating means, which are responsive when the determining means has found that the data item name has been registered in the predetermined dictionary, for creating descriptor data which define descriptor contents according to a format corresponding to the attributes of the data item name and according to the entered written signs.

A second information processing apparatus of the invention comprises written signs entering means for entering written signs in the form of characters, symbols and/or graphicals in a sheet or electronic document, and first descriptor recognizing means for recognizing descriptors in the written signs entered by the written sign entering means. The second information processing apparatus also comprises second descriptor recognizing means for recognizing a composite descriptor on the basis of a plurality of the recognized descriptors corresponding to a plurality of the entered written signs having an association with one another according to predetermined association rules. The second information processing apparatus further comprises determining means, which are responsive to when the second descriptor recognizing means has recognized the composite descriptor that provides an association between a desired data item name and a desired area of the document and when a term indicative of a descriptor type has an association with the first or second descriptor for determining whether the term has been registered in a predetermined dictionary. The second information processing apparatus further comprises descriptor data creating means, which are responsive when the determining means has found that the term has been registered in the predetermined dictionary, for creating descriptor data which specifies descriptor contents according to a format corresponding to the descriptor type corresponding to the term.

A third information processing apparatus of the present invention comprises written signs entering means for entering written signs in the form of characters, symbols and/or graphicals in a sheet or electronic document, and first descriptor recognizing means for recognizing descriptors in the written signs entered by the written sign entering means. The third information processing apparatus also comprises second descriptor recognizing means for recognizing a composite descriptor on the basis of a plurality of the recognized descriptors corresponding to a plurality of the entered written signs having an association with one another according to predetermined association rules. The third information processing apparatus further comprises selecting means, which are responsive when the second descriptor recognizing means has found the composite descriptor that provides an association between a desired data item name and a desired area of the document, for selecting, from a plurality of registered data item name groups, a data item name group to which the desired data item name pertains. The third information processing apparatus further comprises descriptor data creating means for creating descriptor data which define descriptor contents according to a format corresponding to the data item name group selected by the selecting means and according to the entered written signs.

In accordance with the invention, the apparatus can readily define data or files by entering descriptors which are indicative of desired definition contents of a document by means of written signs in the form of familiar characters, symbols and/or graphicals.

Since the apparatus of the invention not only recognizes, from the entered written signs, unitary descriptors having a unitary meaning, but also recognizes composite or complex descriptors on the basis of a plurality of the unitary descriptors corresponding to a plurality of the entered written signs having an association with one another according to predetermined association rules, the apparatus can improve the extensibility or freedom of the descriptor contents.

Since the apparatus of the invention selectively defines data, files or an application (e.g., document making) by using a common item for defining a feature and selecting a type of the data item name, end users as well as system operators can readily define data, files or applications by a simple operation involving very few matters which must be learned.

Users can efficiently define desired commands by a simple operation involving very few matters to be learned.

BRIEF DESCRIPTION OF THE DRAWINGS

The above and other objects, features and advantages of the invention will become more apparent from the following description when taken in conjunction with the drawings, in which:

FIG. 5 shows a table describing a relationship between descriptor elements and written signs in accordance with the system of the embodiment;

FIG. 6 shows a table describing a relationship between descriptor elements and written signs in accordance with the system of the embodiment;

FIG. 7 shows a table describing a relationship between descriptor elements and written signs in accordance with the system of the embodiment;

FIG. 8 shows a table describing a relationship between descriptor elements and written signs in accordance with the system of the embodiment;

FIG. 12 is a view of a main mode screen in accordance with the system of the embodiment;

FIG. 13 is a view of an example of a data definition sheet used to define data in accordance with the system of the embodiment;

FIG. 28 shows a structure of an item descriptor chain which is created in "data definition" in accordance with the embodiment;

FIG. 30 shows a structure of a cell descriptor chain in a field in accordance with the system of the embodiment;

FIG. 31 shows a structure of a cell descriptor chain in a record in accordance 10 with the system of the embodiment;

FIG. 34 is a view of an example of a file definition sheet used to define a file in accordance with the embodiment;

FIG. 36 schematically shows a structure of an item descriptor chain created in the file definition in accordance with the system of the embodiment;

FIG. 38 shows a file management system in accordance with the system of the embodiment;

FIG. 39 is a view of an example of a document sheet used in the document making in accordance with the system of the embodiment;

FIG. 40 is a view of the document sheet in FIG. 39 in which written signs for helping or enabling the document definition in accordance with the system of the embodiment;

FIG. 41 schematically shows a structure of an item descriptor chain used in the document making in accordance with the system of the embodiment;

FIG. 43 schematically shows an application dictionary in which term entries are illustrated in accordance with the system of the embodiment;

FIG. 50 shows a format of a file data record in accordance with the system of the embodiment;

FIG. 51 illustrates how file data records are acquired in accordance with the system of the embodiment;

FIG. 52 is a view of an example of an output document in accordance with the system of the embodiment;

FIG. 54 is a view of a data definition sheet in which written signs for helping or enabling data definition have been entered in accordance with the system of the embodiment.

DETAILED DESCRIPTION OF THE INVENTION

Embodiments of the invention are now described in conjunction with the accompanying drawings.

Figure 1:
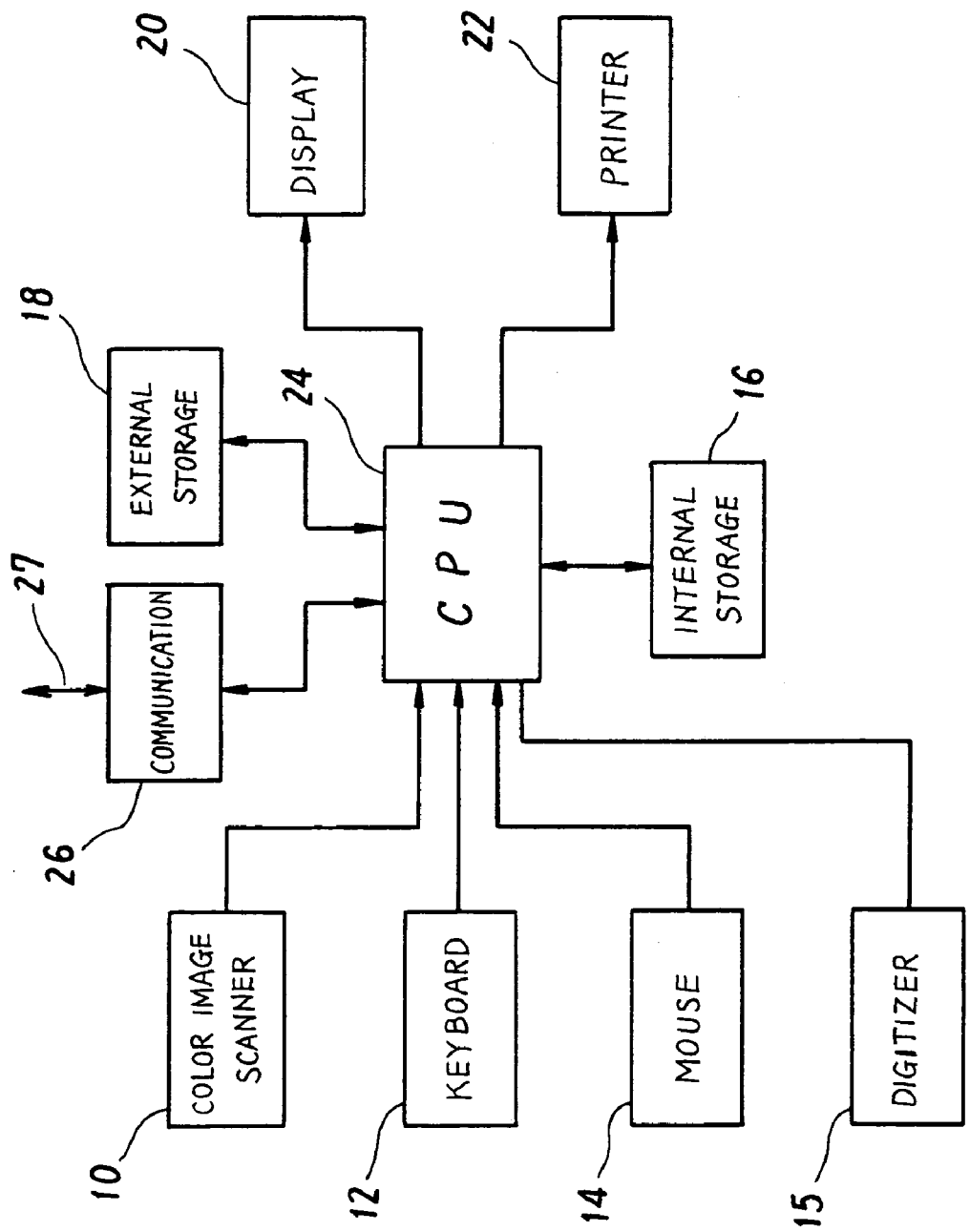
FIG. 1 is a block diagram showing a hardware organization of one embodiment of an information processing apparatus (system) in accordance with the present invention.

FIG. 1 shows a hardware organization of one embodiment of an information processing apparatus or system in accordance with the present invention. In the system of the embodiment a color image scanner 10, a keyboard 12, a mouse 14 and a digitizer 15 each serve as an input device (equipment). An internal storage 16 and an external storage 18 each serve as a storage system. A display 20 and a printer 22 each serve as an output device. The respective components are connected to a CPU 24 via associated interface circuits (not shown). The CPU 24 is also connected to a telephone or communication system 27 via a communication equipment 26.

The color image scanner 10 is used to read a source document sheet 25 having characters, symbols and/or graphicals thereon as a colored image.

The internal storage 16 and external storage 18 store electronic dictionaries, character fonts, files, etc., as well as programs for controlling the CPU 24. The communication equipment 26 comprises a facsimile machine.

Figure 2:
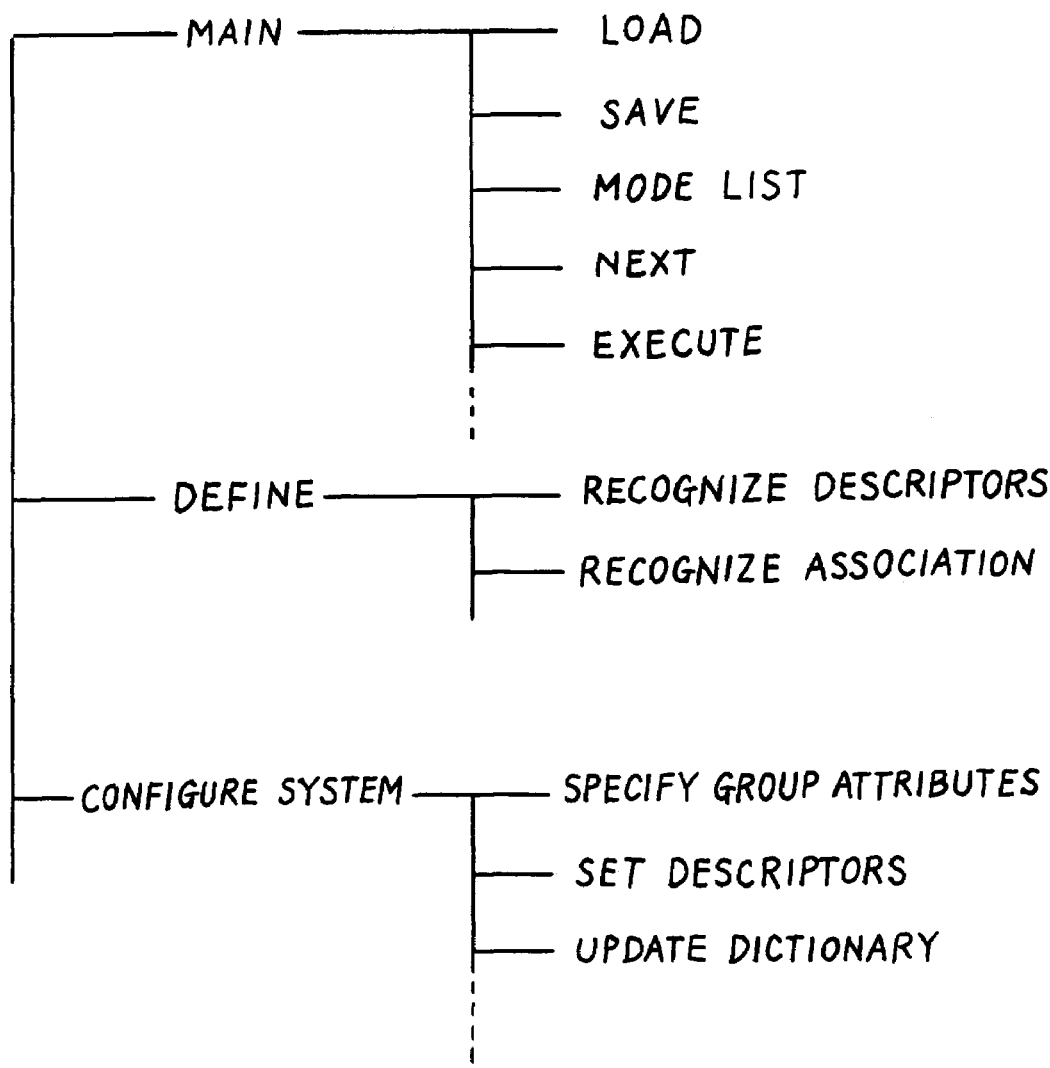
FIG. 2 is a diagram showing a list of operation modes of the system according to the embodiment.

FIG. 2 shows a list of modes of operation in which the system of the embodiment makes a document. Main modes are "MAIN", "DEFINE", "CONFIGURE SYSTEM", etc. Each main mode of "MAIN", "DEFINE", "CONFIGURE SYSTEM" is subdivided into submodes of "LOAD", etc. "RECOGNIZE DESCRIPTORS" etc., "SPECIFY GROUP ATTRIBUTES", etc., respectively.

Figure 3:
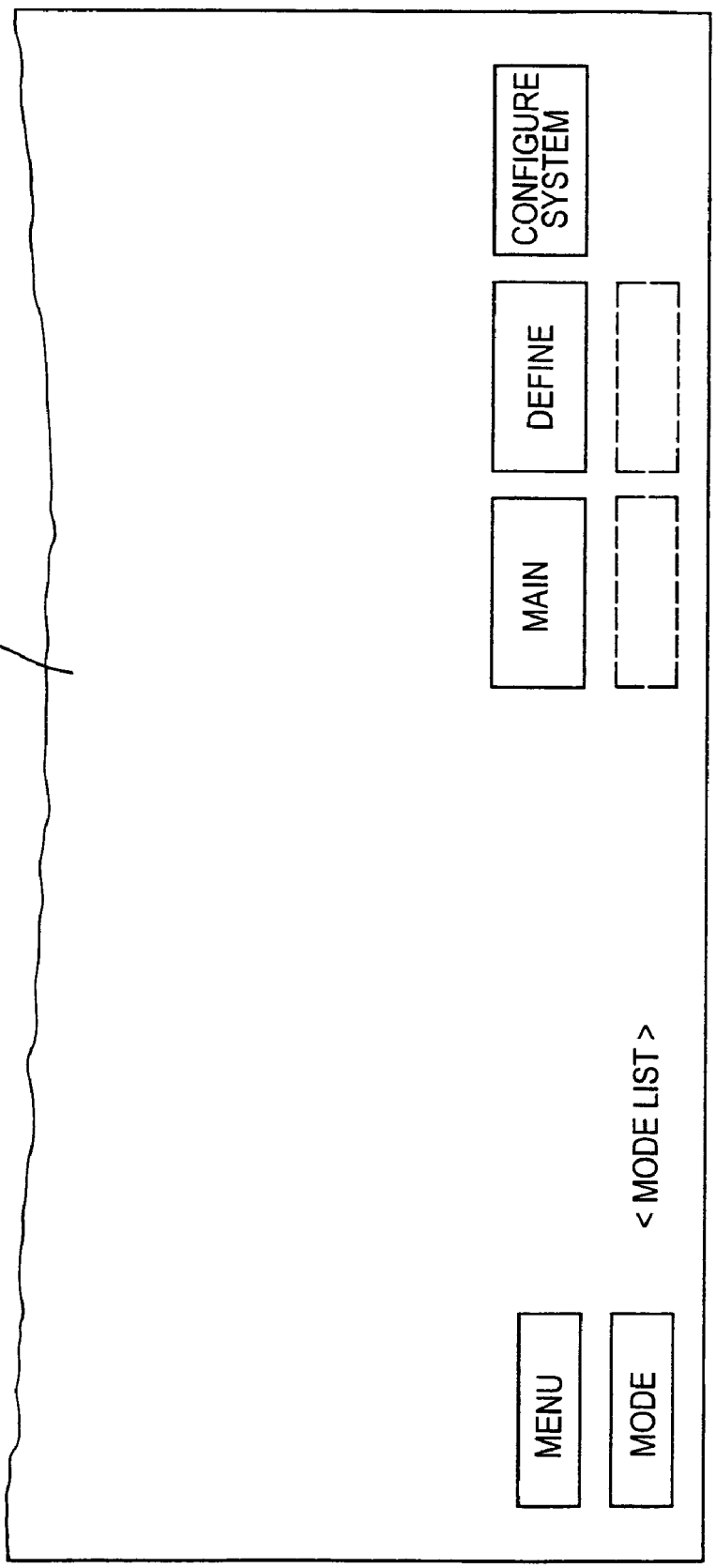
FIG. 3 is a view of a main mode menu screen in the system of the embodiment.

FIG. 3 depicts a "MAIN MODE MENU SCREEN" which is presented on a display screen 20a of the display 20. The "MAIN MODE MENU SCREEN" presents buttons for selecting the main modes of "MAIN", "DEFINE", "CONFIGURE SYSTEM", etc. at the bottom right of the display screen.

Figure 4:
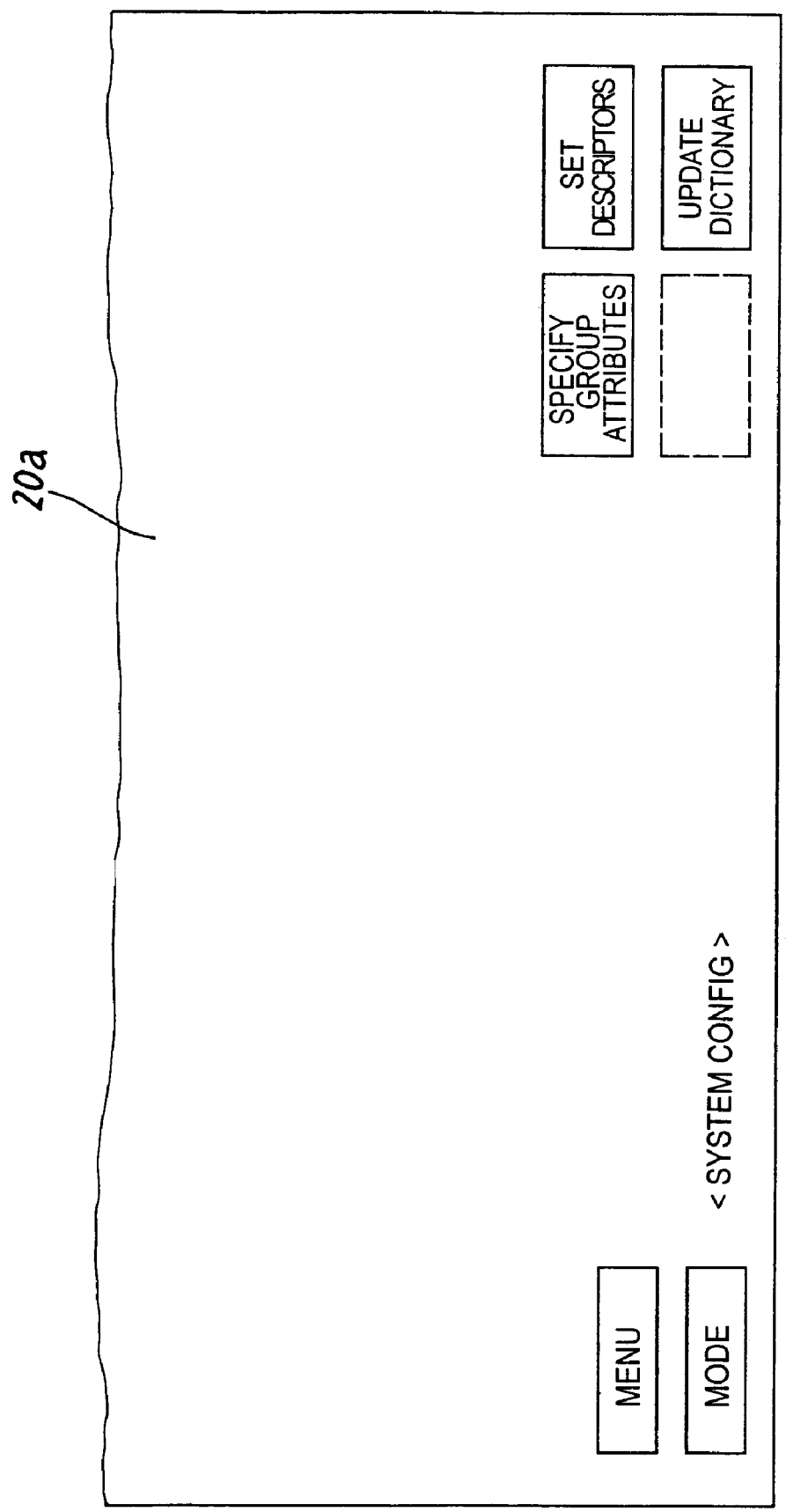
FIG. 4 is a view of a configure system mode screen in the system of the embodiment.

When the "CONFIGURE SYSTEM" button is clicked from the "MAIN MODE MENU SCREEN", the system enters a configure system mode, which presents a "CONFIGURE SYSTEM MODE SCREEN" shown in FIG. 4 on the display screen 20a. As shown in FIG. 4, when the "CONFIGURE SYSTEM MODE SCREEN" is presented on the display screen 20a, buttons for selecting submodes of "SPECIFY GROUP ATTRIBUTES", "SET DESCRIPTORS", "UPDATE DICTIONARY", etc. appear at the bottom right of the display screen 20a. If the "SET DESCRIPTORS" button is clicked, the system enters a set descriptors mode, which presents on the screen 20a a table for illustrating relationships between descriptor elements and written signs, such as the ones shown in FIGS. 5 to 8.

In FIGS. 5 to 8, the embodiment employs a plurality of different descriptor groups such as "COMMON", "MANAGE DATA", "DEFINE DATA", "DEFINE FILE", "DEFINE COMMAND/PROCEDURE", "FORMAT DOCUMENT", "EDIT DOCUMENT", etc. Each descriptor group includes a plurality of descriptor elements. Descriptor elements pertaining to the "MANAGE DATA", "DEFINE DATA", "DEFINE FILE" or "DEFINECOMMAND/PROCEDURE" descriptor group are used to specify a required data-managing of a document. Descriptor elements pertaining to the "FORMAT DOCUMENT" or "EDIT DOCUMENT" descriptor group are used to specify a required document format. Those descriptor elements pertaining to the "COMMON" descriptor group are used in common with the "MANAGE DATA", "DEFINE DATA", "DEFINE FILE", "DEFINE COMMAND/PROCEDURE", "FORMAT DOCUMENT" and "EDIT DOCUMENT" descriptor groups.

As shown in FIGS. 5 to 8, each descriptor element is defined by a written sign in the form of a character or characters (character string), symbol(s) and/or graphical(s). Some descriptor elements, such as "ROUNDING" pertaining to the "MANAGE DATA" descriptor group, directly specify the descriptor content e.g. "ROUND UP". Some other descriptor elements (such as the descriptor element of "DATA ITEM" pertaining to the "COMMON" descriptor group and corresponding to a written sign of "< >") mark or designate another written sign or item as contents (e.g., a data item) thereof. Other descriptor elements such as the descriptor element of "DESIGNATE DESCRIPTOR ELE- MENT", which pertains to the "COMMON" descriptor group and which is defined by a written sign of "O", is used to designate, as a descriptor element, a predetermined written item of character(s) and/or symbol(s) located in the written sign of "O". Other descriptor elements request a dictionary search for a written item of character(s) and symbol(s) for specifying contents.

As in the relationship between the "TYPE" and the "NUMERIC", "TEXT", "SUM 25 NUMERIC" descriptor elements in the "DEFINE DATA" descriptor group, a data item name (TYPE) and data names (NUMERIC, TEXT, SUM NUMERIC) to be paired or associated therewith may be individually registered as a descriptor element. Such a paired relationship is indicated in the table of relationships.

Figure 9:
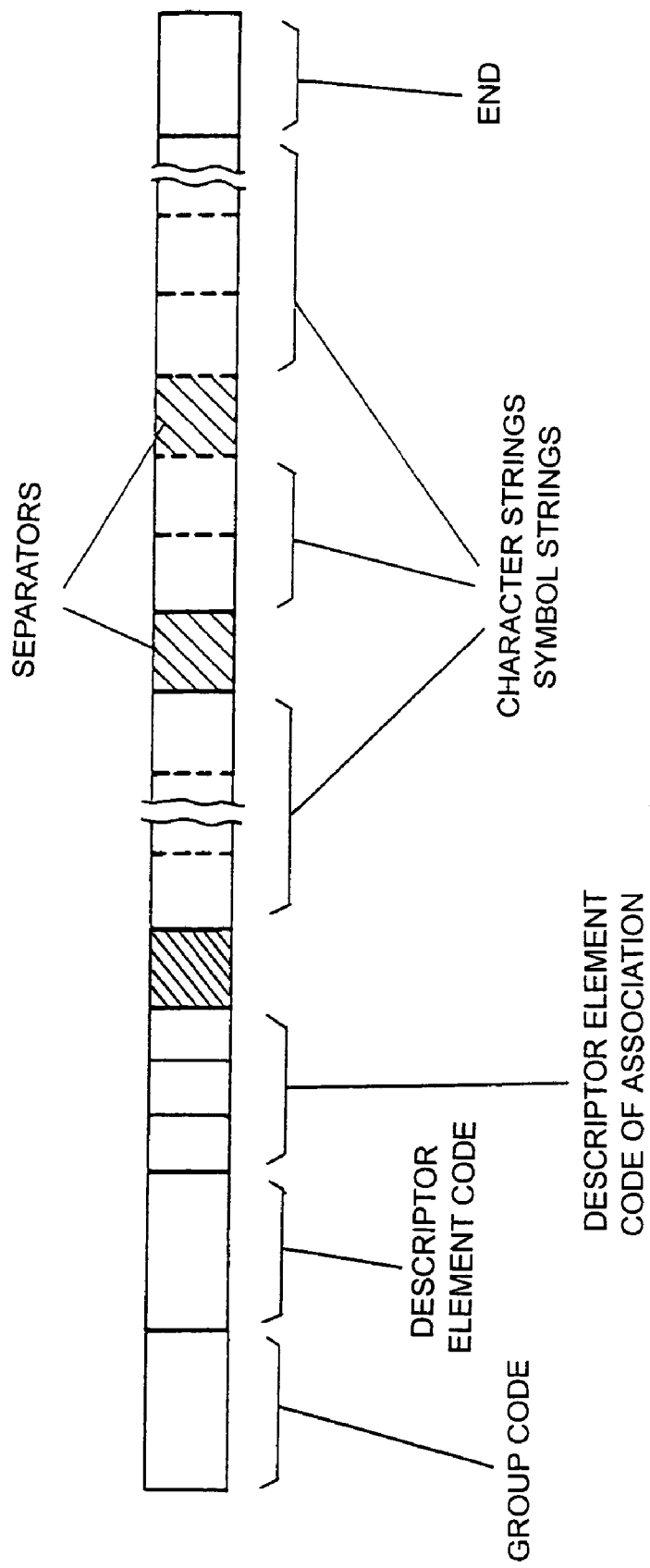
FIG. 9 is a format of a descriptor element specifier in accordance with the system of the embodiment.

The relationship between descriptor elements and written signs may be preset in the system. In the alternative, it may be user-programmable in a display driven system. In either case, for implementation of the descriptor elements-to-written signs table shown in FIGS. 5 to 8, descriptor element specifiers having a variable length format shown in FIG. 9 are used. A set of descriptor element specifiers are stored in a descriptor element specifier file storage 48 FIG. 25) which is used for recognizing descriptor elements as will be hereinafter described.

As shown in FIG. 9, each descriptor element specifier record has a group code field which is indicative of a descriptor group code of, say, "FORMAT DOCUMENT" to which a descriptor element of, say, "RIGHT JUSTIFICATION" pertains, a descriptor element code field indicative of the descriptor element code (right justification code), a written sign data field which is indicative of a corresponding written sign of a character (character string) or symbol (e.g., "R", "RJ", "JUSTIFY") with separator codes, and the last field which is indicative of the end of the record.

A data field of descriptor element codes of an association is set to the code(s) of counterpart descriptor element(s), if any, to be associated or paired therewith. For example, "NUMERIC", "TEXT", and "SUM NUMERIC" are to be paired or associated with "TYPE" in the "DEFINE DATA" descriptor group. Thus, if the descriptor element specifier is "TYPE", this data field is set to the descriptor element codes of "NUMERIC", "TEXT", and "SUM NUMERIC." On the other hand, if the descriptor element specifier is "NUMERIC", "TEXT" or "SUM NUMERIC", the data field is set to the descriptor element code of "TYPE."

In accordance with the present embodiment, descriptor elements for document definition are indicated and specified by written signs in the form of characters, symbols and/or graphicals. Such written signs may also be used as ordinary written items which are representative of the document contents. When written signs are used for descriptor elements, the written signs are qualified with a special attribute (by color, for example) so as to distinguish such written signs from ordinary written items which are representative of the document contents. In doing so, a user can use familiar written signs as ordinary written items which are representative of the document contents or as symbols of descriptor elements by qualifying them with unique attributes.

When a user clicks a submode select button "SPECIFY GROUP ATTRIBUTES" from the "CONFIGURE SYSTEM MODE SCREEN" in FIG. 4, the system presents a "SPECIFY DESCRIPTOR ATTRIBUTES SCREEN" (see FIG. 10) on the display screen 20*a*.

Figure 10:
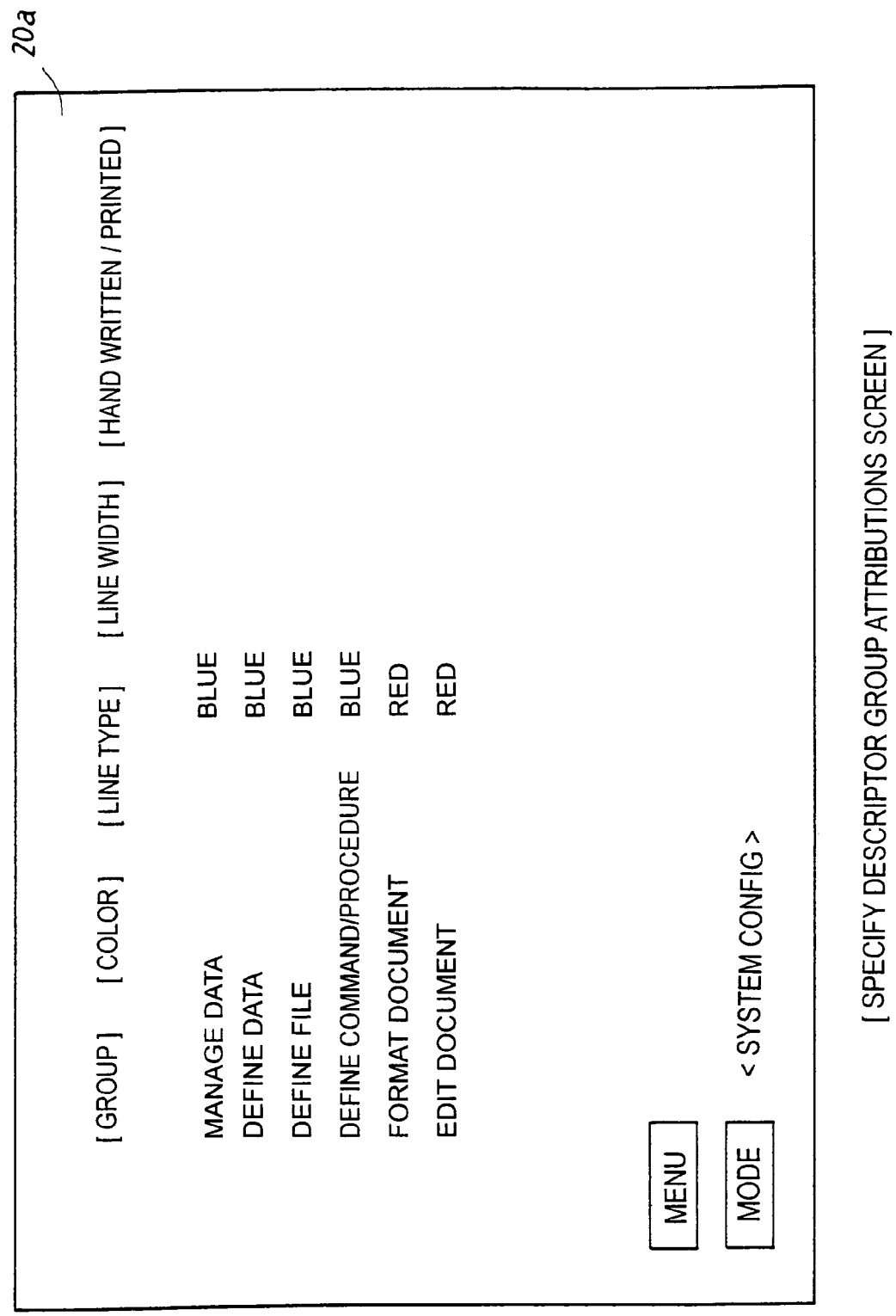
FIG. 10 is a view of a specify descriptor group attributes screen in accordance with the system of the embodiment.

In FIG. 10, a "GROUP" column lists descriptor groups, such as "MANAGE DATA", "FORMAT DOCUMENT", "EDIT DOCUMENT", etc. The user may enter or specify attributes of respective descriptor groups, such as color, line type, line width and hand-written/printed.

In the case of FIG. 10, the "MANAGE DATA", "DEFINE DATA", "DEFINE FILE" and "DEFINE COMMAND/PROCEDURE" descriptor groups each have a color attribute of "BLUE", and the "FORMAT DOCUMENT" and "EDIT DOCUMENT" descriptor groups each have a color attribute of "RED", as entered in the screen of FIG. 10. Since common descriptor elements are commonly used in all descriptor groups, there is no need to qualify them as "COMMON."

Figure 11:
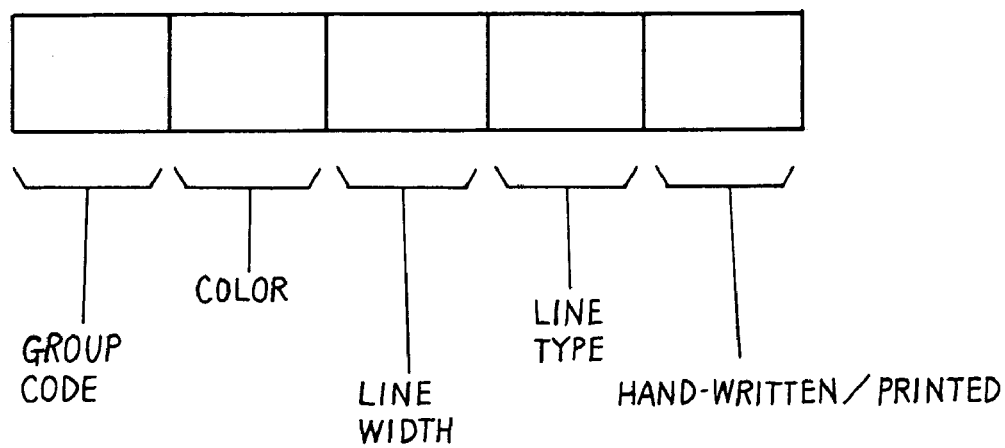
FIG. 11 shows a data format of a descriptor group attributes specifier in accordance with the system of the embodiment.

In response to the entered descriptor group attributes, the system makes descriptor group attribute records, such as the descriptor group attribute record shown in FIG. 11, for the respective descriptor groups. A set of descriptor group attribute records are stored into a group attribute file storage 50 (FIG. 25), which will be used for creating descriptor records.

FIG. 12 shows a MAIN MODE SCREEN. The MAIN MODE SCREEN presents submode buttons of "LOAD", "SAVE", "NEXT", "EXECUTE", etc. at the bottom right of the display screen 20*a*. When a submode select button is clicked, the system enters a corresponding submode. The MAIN MODE SCREEN is invoked at the time when the system is turned on as a default reply. When the "MODE" button (the one normally displayed at the bottom left of the display screen 20*a*) is clicked, the "MAIN MODE MENU SCREEN" is invoked.

A data defining feature and a file defining feature of the system of the embodiment as a prerequisite for an application, such as document making, will be now described.

The present system uses a data definition sheet, such as the one shown in FIG. 13, to define data. The data definition sheet provides a list of data item names of an application system to be configured and their attribute names. A specification sheet written by a system engineer may be used directly as the data definition sheet. In the alternative, it may be made newly using the document making feature of the system of the embodiment.

In the present example, the data definition sheet takes the form of a sheet with the background color of, say, white on which document contents have been written or printed with a black colored writing material, ink, toner or the like.

The data definition sheet presents a table having horizontal and vertical ruled lines with predetermining spacing. The table lists basic data items which are preset in the system for data definition, and desired data names which are used in the application and which correspond to the respective basic data items.

More specifically, the top row of the table, which is defined as an item entry row, indicates the character strings of "DATA ITEM NAME", "TYPE", "MASTER NAME" and "SYNONYM" which are representative of basic item names that are preset in the system in such a manner that each cell of the table contains a single basic data item. The item entry row is followed by data entry rows. The first data entry row just below the item entry row presents a character string "CLASS" as a data name of "DATA ITEM NAME", a character string "TEXT" as a data name of "TYPE", a character string "ARTICLE CLASS MASTER" as a data name of "MASTER NAME", and a character string "ARTICLE CLASS" as a data name of "SYNONYM" with each cell containing a single data name.

The description of the data entry row (record) means that "CLASS" is declared as a "DATA ITEM" in the application, "CLASS" is a type of "TEXT" data, contents of the "CLASS" are registered in the "ARTICLE CLASS MASTER" file, and "ARTICLE CLASS" is a synonym to the "CLASS."

The second and subsequent data entry rows present attribute data names of "TYPE", "MASTER NAME" and "SYNONYM" for respective application data item names of "ARTICLE CODE", "SALES", "UNIT PRICE", etc.

As described above, the data definition sheet (FIG. 13) is a document carrying ordinary writings (ordinary characters, symbols and/or graphicals which are representative of document contents). Thus, the contents of the data definition sheet can readily be understood by operators (e.g., system engineers).

Should the data definition sheet be entered directly into the present system, however, the system recognizes it as an ordinary document rather than a data definition sheet.

To enable the system to recognize definition contents of the data definition sheet just as the operator would, written signs for helping or enabling the system to recognize the desired data definitions are added to the document contents represented by ordinary writings before the system reads the document.

Figure 14:
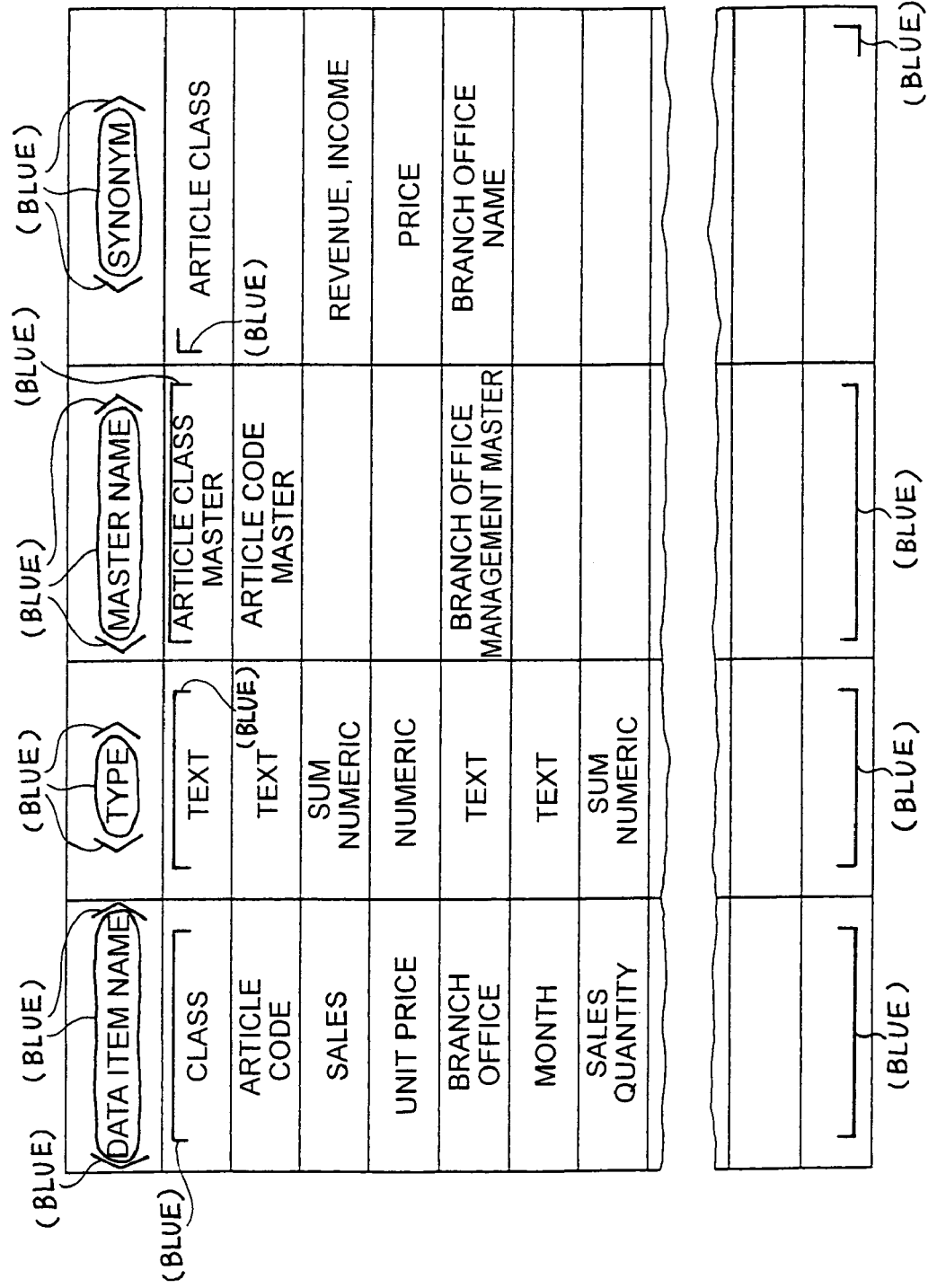
FIG. 14 is a view of the data definition sheet in FIG. 13 in which written 25 signs for helping or enabling data definition have been entered.

As illustrated in FIG. 14, written signs in the group of "DEFINE DATA" for helping the system to recognize the data definitions are entered in blue into the data definition sheet (FIG. 13).

In the data item name entry row in FIG. 14, blue colored descriptor written signs "O" for designating a descriptor element surround the black colored data item name character strings "DATA ITEM NAME", "TYPE", "MASTER NAME" and "SYNONYM." In addition, blue colored descriptor written signs "< >" placed around the data items operate to parenthesize these data items.

This means that the character strings "DATA ITEM NAME", "TYPE", "MASTER NAME" and "SYNONYM" are each defined as a descriptor element which is indicative of a data item name.

In the data entry area, as shown in FIG. 14 vertical fields (cell strings) corresponding to the data item names "DATA ITEM NAME", "TYPE", "MASTER NAME" and "SYNONYM", each has a top and bottom cell in which a descriptor written sign "[ ]" for designating a domain is entered. This descriptor written sign indicates that each vertical field (cell string) is a data entry field in which data of a corresponding data item name is or will be entered.

The data definition sheet (FIG. 14) with additional written signs for helping or enabling the system to recognize data definitions is entered into the present system via the color image scanner 10.

Figure 15:
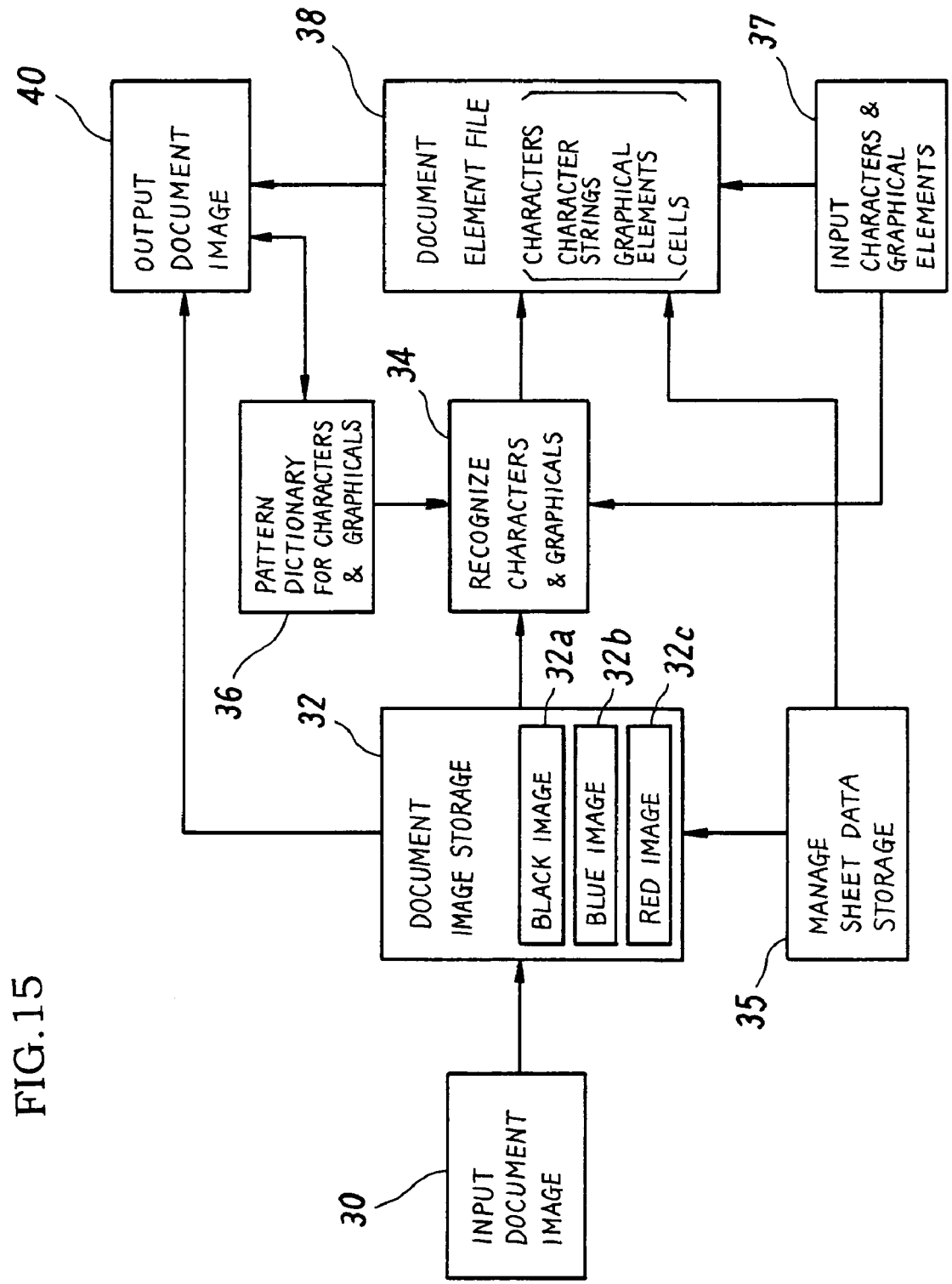
FIG. 15 is a block diagram showing functions of a subsystem in the embodiment for inputting a source document and for creating document elements therefrom.

FIG. 15 shows a function of a subsystem in the system of the embodiment for inputting a document and creating a document element file therefrom. An input document image block 30 is implemented by input devices including the color image scanner 10, keyboard 12 and/or mouse 14, by the CPU 24 for executing input routines, and by an internal or external storage 16, 18 for receiving the entered color image. A document image storage 32, a pattern dictionary 36 containing characters and graphicals, and a document element file storage 38 each reside in the internal or external storage 16, 18. A recognize characters and graphicals block 34 is implemented by the CPU 24 for executing a recognize characters and graphicals routine (process). An output document image block 40 is implemented by the CPU 24 for executing a display control program, and the display unit 20 displays a document image under the control of the CPU 24 or the communication equipment 26 transmits the document image.

Figure 16:
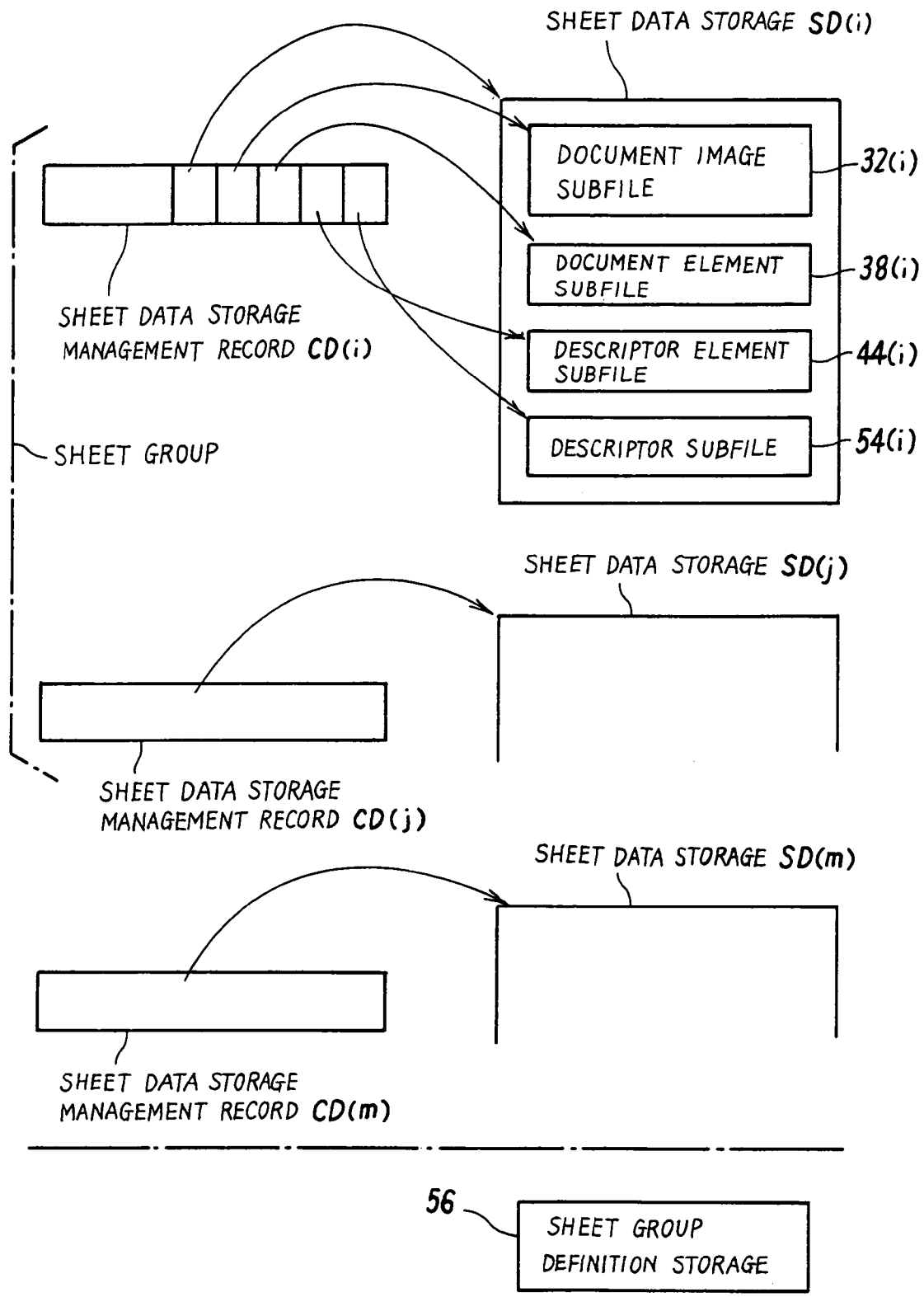
FIG. 16 schematically illustrates sheet data storage management in accordance with the system of the embodiment.
Figure 17:
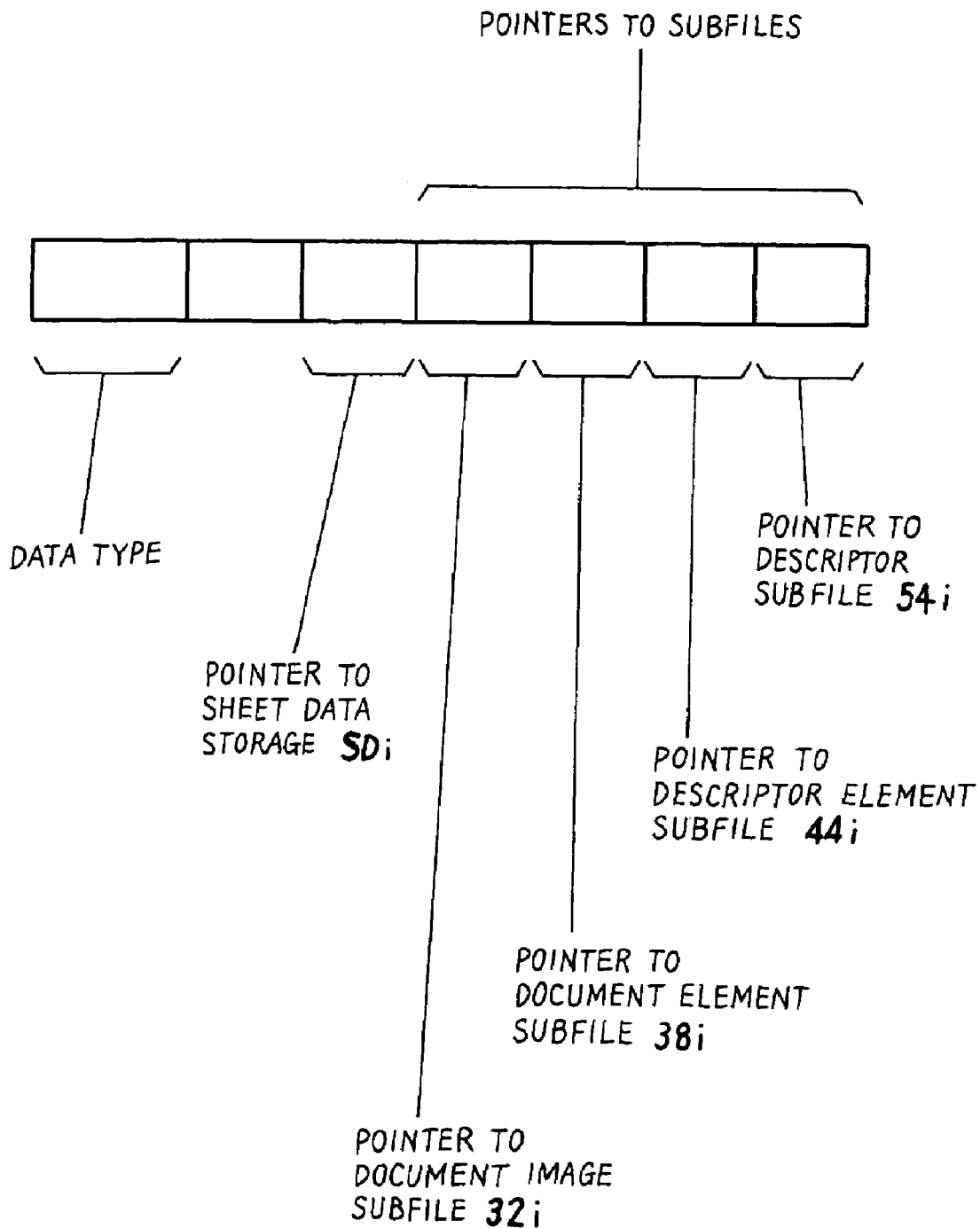
FIG. 17 shows a data format of a sheet data storage management record in accordance with the system of the embodiment.

The document image storage 32 and the document element file storage 38 are divided into document image subfiles 32 (i) and document element subfiles 38 (i) according to individual sheets or pages PAi. As shown in FIGS. 16 and 17, sheet data storage management records CD (i) are used to manage the storage of document image subfiles 32 (i) and document element subfiles 38 (i). A manage sheet data storage block 35, as shown in FIG. 15, creates such sheet data storage management records for the individual sheets or pages PAi.

In the present system, a common process may be applied to a plurality of different documents or pages according to a definition. Such a plurality of documents (pages) are grouped into a sheet group. A user's message for grouping a plurality of document sheets may be provided to the system in several ways. For instance, a user operates a predetermined button. Then, the image scanner 10 reads a plurality of document sheets in succession. The plurality of the document sheets are recognized by the system as pertaining to the same sheet group.

The color image scanner 10 reads the present data definition sheet (FIG. 14). The color image data from the scanner 10 is stored into a document image storage in the input document image block 30. The color image data which is representative of the data definition sheet is decomposed into black, blue and red color image components, respectively which are respectively, stored into a black image storage 32a, blue image storage 32b and red image storage 32c within the document image storage block 32.

The recognize characters and graphicals block 34 recognizes individual characters and graphical elements from the respective image color components of black, blue and red stored in the document image storage block 32. The graphical elements refer to simple graphical symbols such as a line, rectangle, circular loop, etc. having a shape which is easy to be pattern-recognized.

Figure 18:
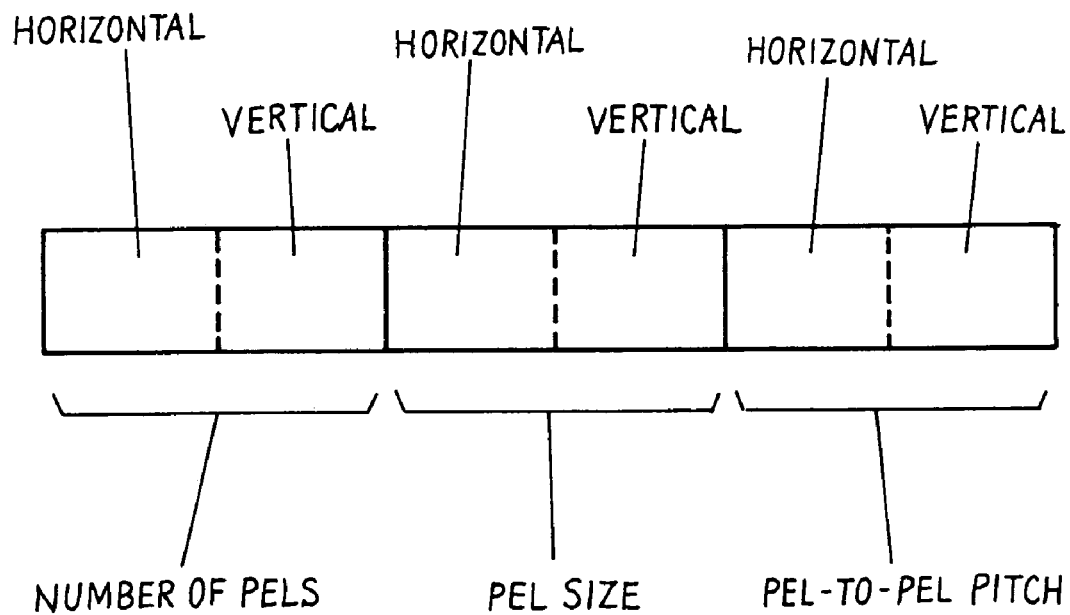
FIG. 18 shows a data format of an image convention record in the system of the embodiment.
Figure 19:
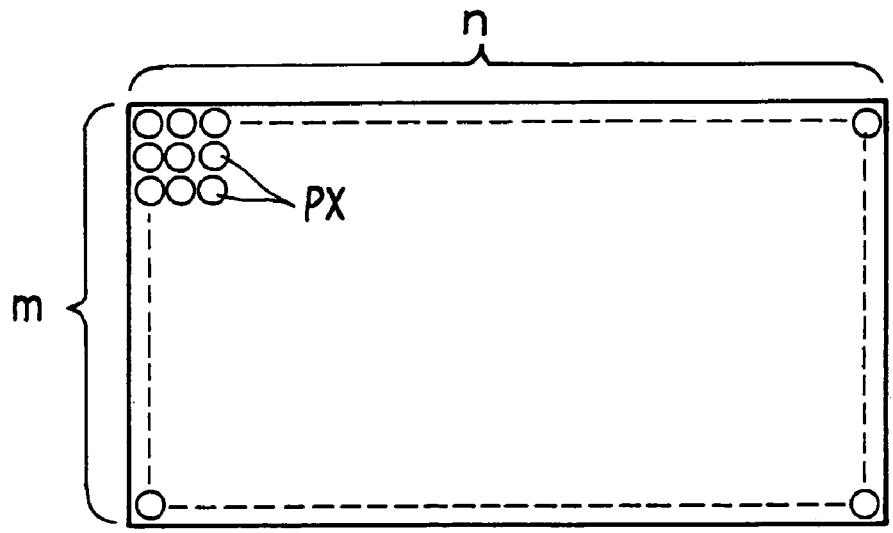
FIG. 19 is a diagram showing a screen image configuration which is an object of the image convention record in the system of the embodiment.

In connection with the image pattern-recognition, an image convention record, such as the one shown in FIG. 18 is referenced. The image convention record specifies the entered image data structure which is configured by a matrix of a large number of pixels (pels) PX shown in FIG. 19, specifying the number of pels PX, pel size, pitch, etc.

The recognize characters and graphicals block 34 recognizes individual characters and graphical elements based on stroke analysis by which strokes constituting a character or graphical element are found. Any suitable prior art stroke analysis may be employed. For example, a group of dots having a specific color is first located. Then, a nearby or surrounding area is searched so as to find an extending direction of the dot group. The process of the dot group tracing repeats until the stroke which is drawn by such a dot group terminates. In the dot group tracing process, when the stroke has changed suddenly, the point is identified as a deflection or vertex.

Each stroke is classified into one of a predetermined stoke patterns depending on the shape and size of the stroke. In the embodiment, the pattern dictionary 36 for characters and graphicals, as an electronic dictionary, has stroke features and special relationship between constituent strokes for respective characters and graphical elements stored therein. The recognize characters and graphicals block 34 repeats a matching process which involves matching a combination of adjacent strokes found in the stroke analysis against entries in the pattern dictionary 36 to thereby recognize individual characters, symbols and graphicals.

Ruled lines of a tabular document are recognized as follows. At first, the stroke analyzer recognizes straight lines. If such a straight line is much longer than an ordinary line and generally extends horizontally (X axis) or vertically (Y-axis), the line is considered a horizontal or vertical ruled line. The direction of the found ruled line is adjusted in parallel to a horizontal or vertical line. In the case when a ruled line end is found close to an end or point of another ruled line within a predetermined limit, the ruled line end is considered meeting or coinciding with the another ruled line end or point, and the ruled line location is adjusted correspondingly.

The recognize characters and graphicals block 34 recognizes characters and graphicals from respective image color components (black, blue, red) of the entered document, as mentioned above, to thereby create document element records of character, character string, graphical element, mark, etc., according to the data format shown in FIG. 20 to FIG. 24.

Figure 20:
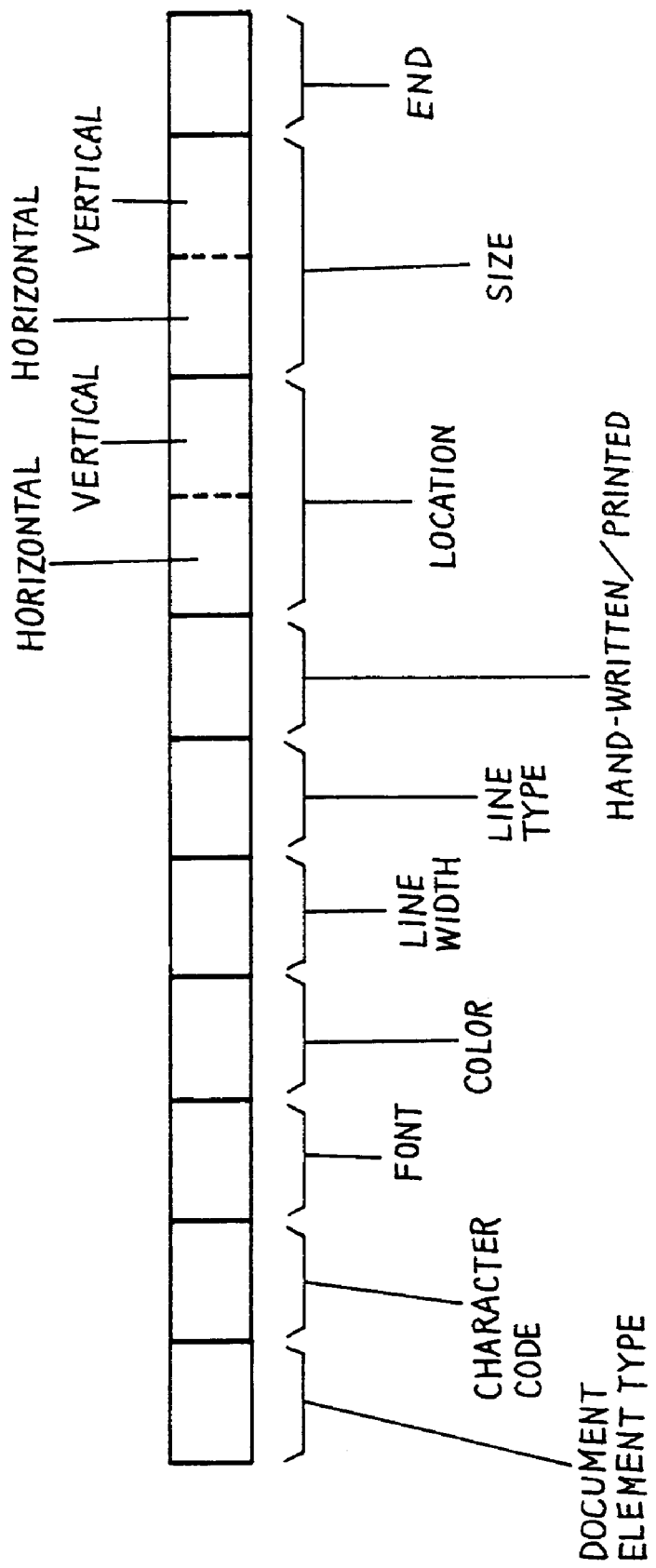
FIG. 20 shows a data format of a character record in accordance with the system of the embodiment.

FIG. 20 shows a data format example of a document element record (character record) of a single character. The character record includes a character code, font, color, line width, line type (solid, dotted, chained etc.,), 10 handwritten/printed (meaning that the character is hand-written or printed), location and size (character size) in respective data fields, and ends with an end of record "END."

Figure 21:
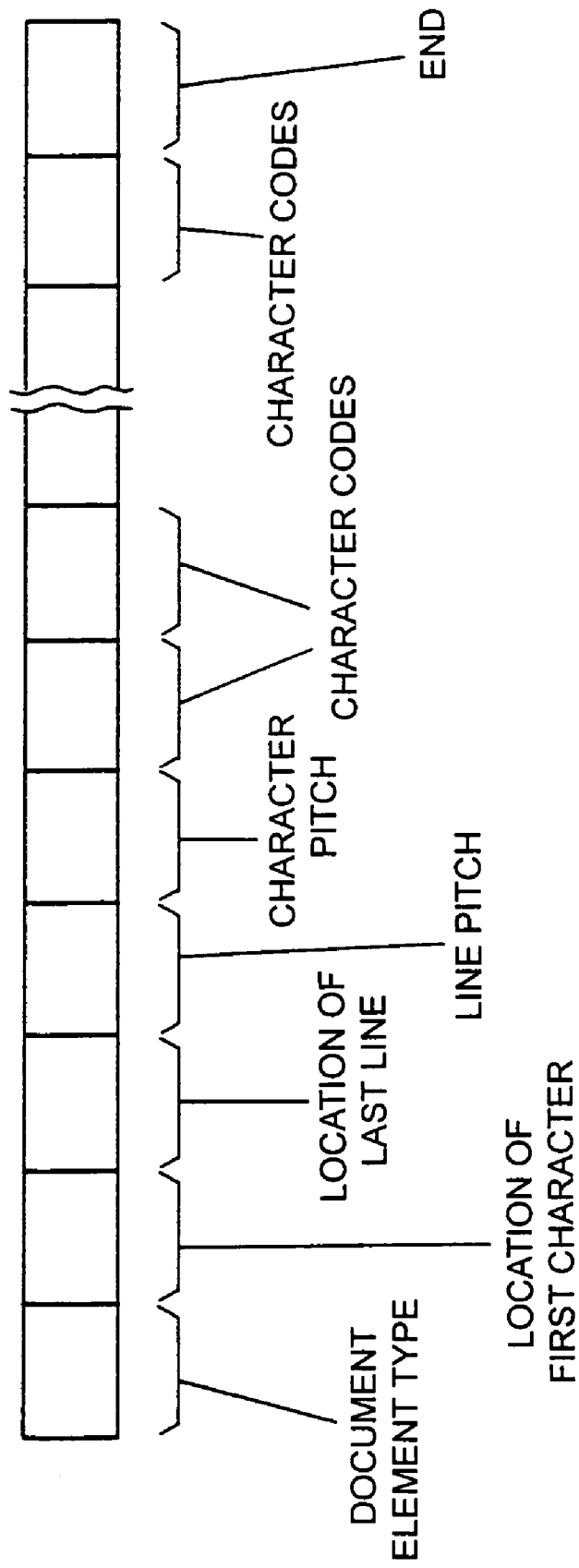
FIG. 21 shows a data format of a character string record in accordance with the system of the embodiment.

FIG. 21 shows a data format example of a document element (character string) record of a character string. The character string record includes the location data of a character string "LOCATION OF FIRST CHARACTER" and "LOCATION OF LAST CHARACTER", layout data of the string "LINE PITCH" and "CHARACTER PITCH", and character codes of the character string, arranged in the order of the string.

Figure 22:
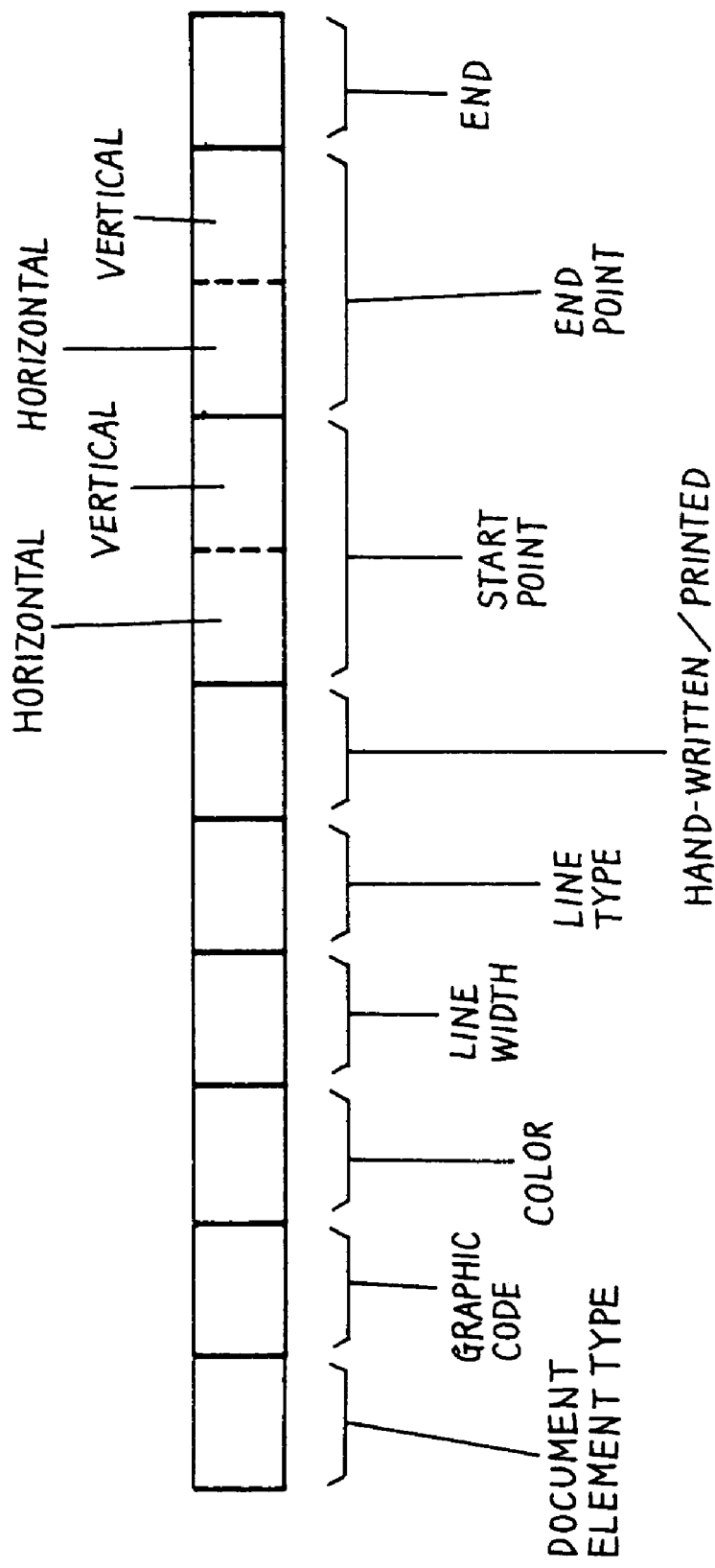
FIG. 22 shows a data format of a graphic element record of a line in accordance with the system of the embodiment.
Figure 23:
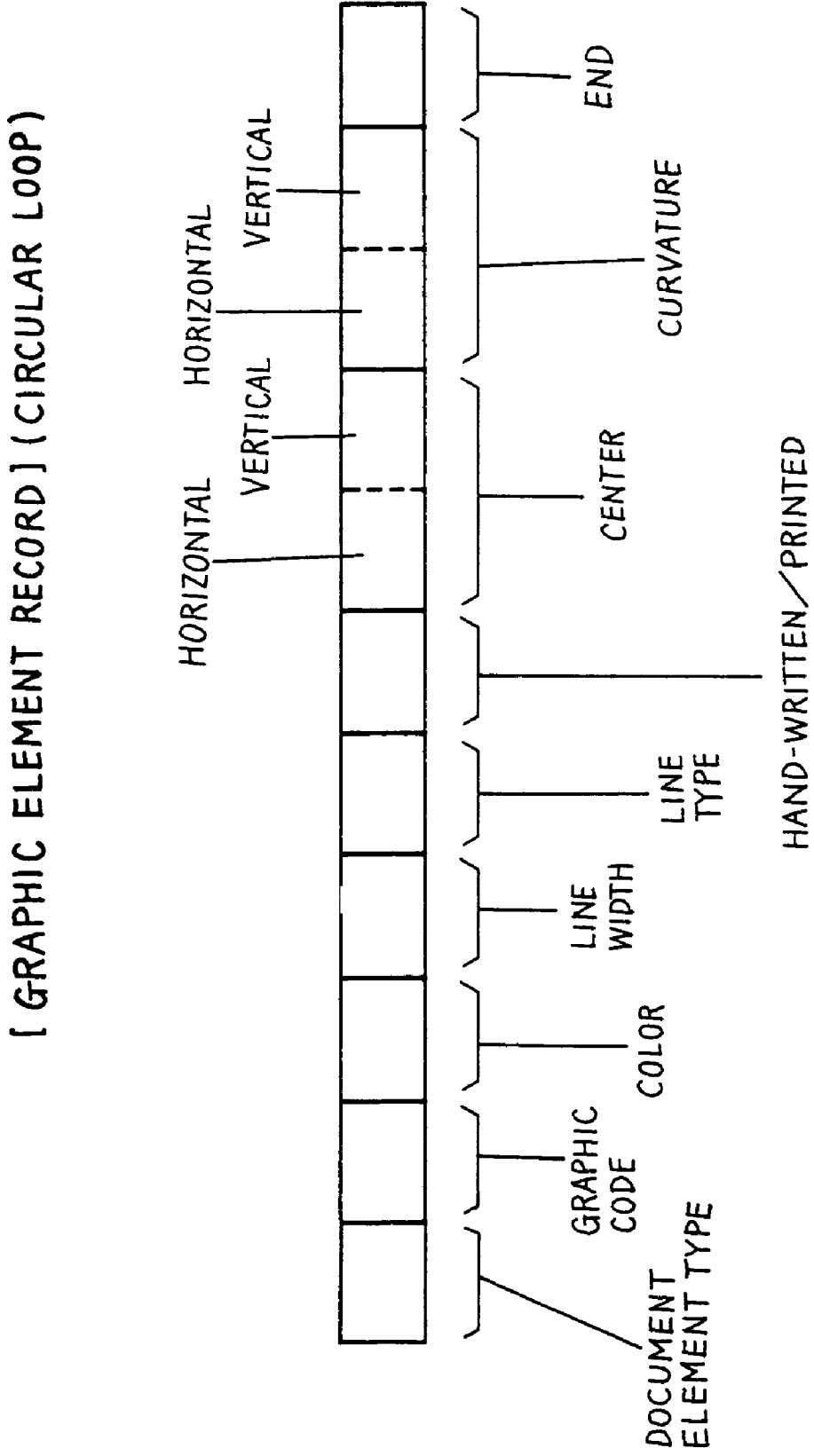
FIG. 23 shows a data format of a graphic element record of a circular loop in accordance with the embodiment system.
Figure 24:
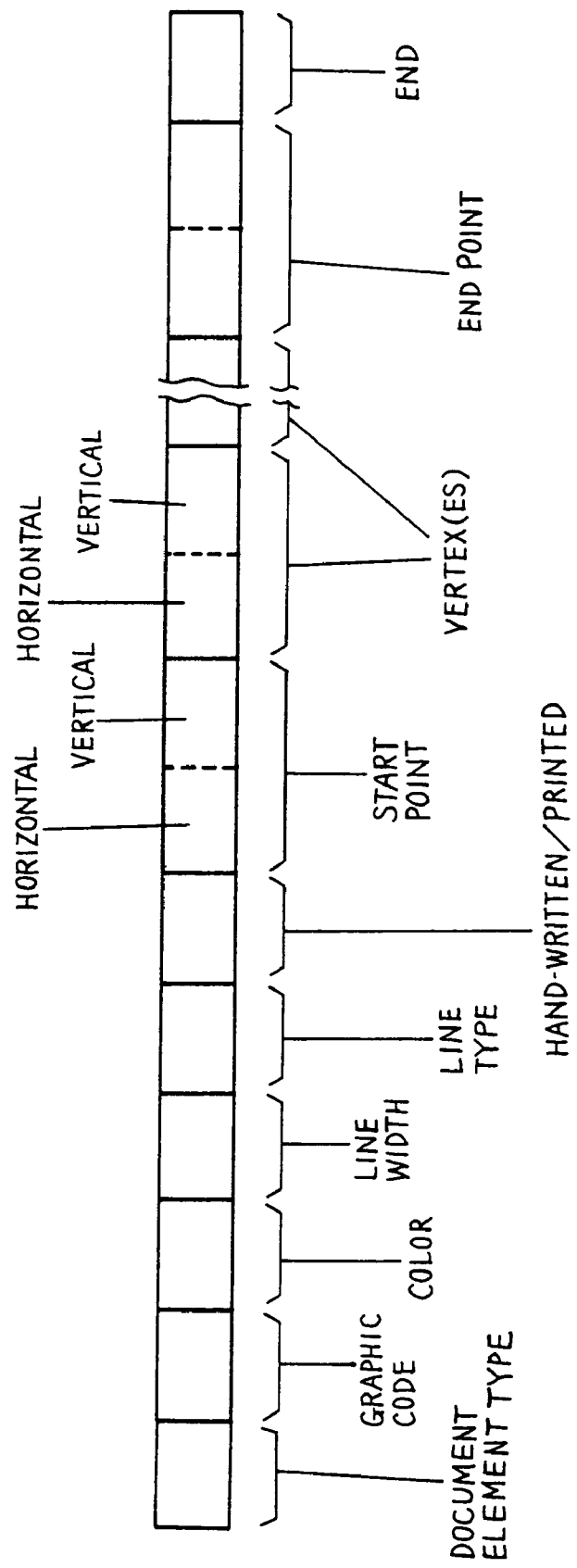
FIG. 24 shows a data format of a graphic element record of a rectangle etc., in accordance with the system of the embodiment.

FIGS. 22, 23 and 24 show a data format example of document element 20 (graphic element) records each corresponding to a single graphical element or symbol. As shown in FIG. 22, a graphic element record of a line includes a start and end point data of the line. As shown in FIG. 23, a graphic element record of a circular loop includes data indicating the center location (x, y) and curvature size (in the x and y directions) of the circular loop. As shown in FIG. 24, a graphic element record of a rectangle, "<" or the like, includes data indicating the deflection point or vertex (where the stroke direction sharply changes) in addition to the start and end points.

In this manner, the recognize characters and graphicals block 34 recognizes individual characters (character strings), symbols and graphicals included in the entered document sheet image so as to make document element records thereof. The collection of the document element records made from a document sheet is stored into the storage 38 as a document element subfile for that sheet. Those image entries of written signs or items whose elements have been recognized into the document element records may be deleted from the document image storage 32.

The output document image block 40, as shown in FIG. 15, may output an image of an entered document based on the image data stored in the document image storage 32. It may also output an image of a document from the document element file storage 38 by reconstructing image data from the stored document element records using the pattern dictionary 36.

Figure 25:
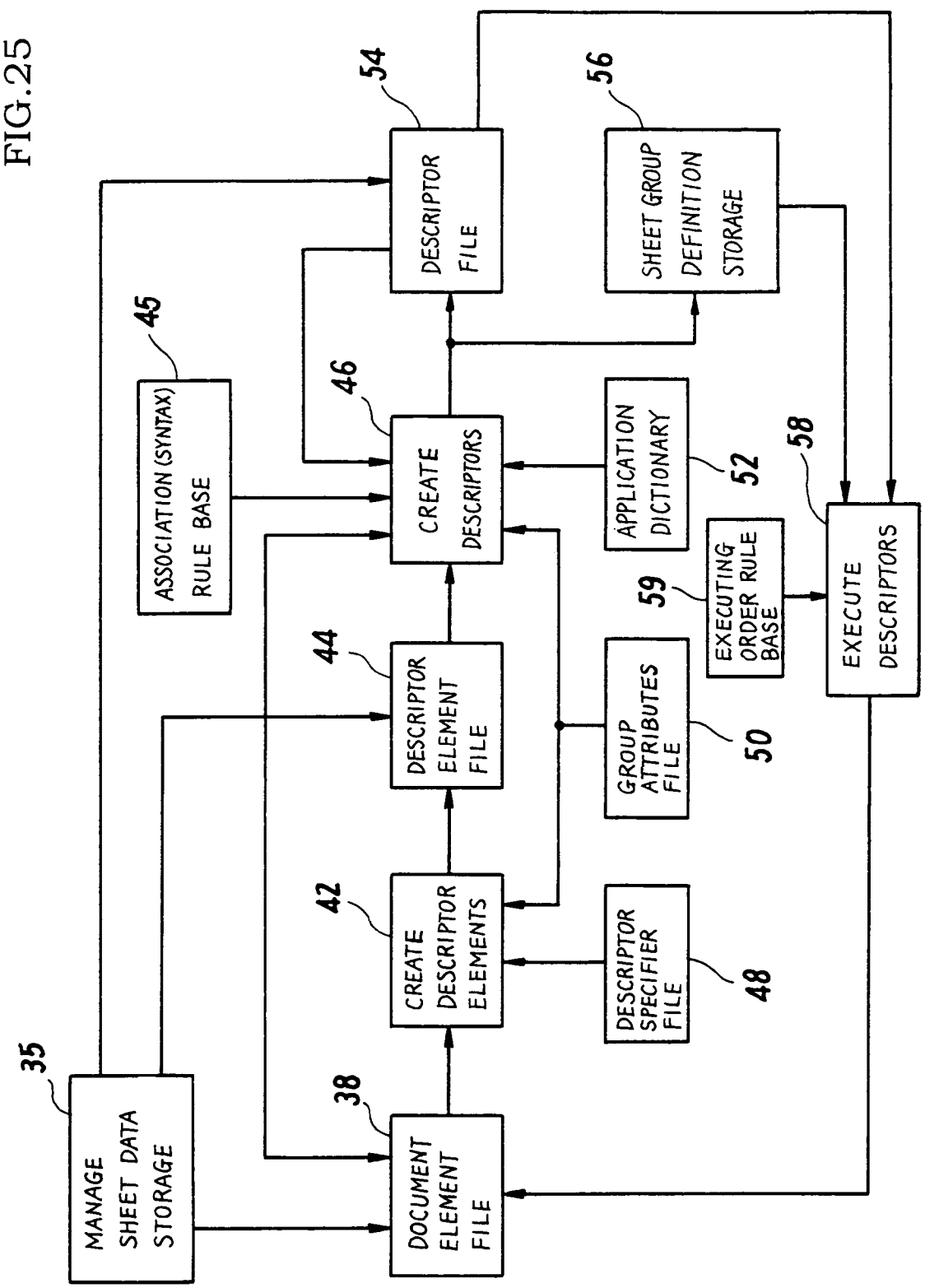
FIG. 25 is a block diagram showing functions of a subsystem in the embodiment for recognizing descriptors, formatting, and executing descriptors.

FIG. 25 shows a feature of the embodiment for recognizing descriptors and formatting a document. A create descriptor elements block 42 and a create descriptor command block 46 are implemented by the CPU 24 for executing a process of creating descriptor elements and descriptors. The association (syntax) rule base storage 45, descriptor element specifier file storage 48, group attribute file storage 50, application dictionary storage 52, descriptor file storage 54, and sheet group definition storage 56 reside in predetermined areas of the internal and/or external storages 16, 18.

The descriptor element file storage 44 and the descriptor file storage 54 are divided into descriptor element subfiles 44 (*i*) and descriptor subfiles 54 (*i*) according to the entered or source document sheets or pages PAi.

As shown in FIGS. 16 and 17, sheet data storage management records CD (i) are used to manage descriptor element subfiles 44 (*i*) and descriptor subfiles 54 (*i*). The manage sheet data storage block 35 creates sheet data storage management records CD (i) for the respective source document sheets or pages PA (i).

In the arrangement of FIG. 25, the create descriptor elements block 42 looks up the descriptor element specifier file 48 of the descriptor element specifier records (FIG. 9) and the group attribute file 50 of descriptor group attribute specifier records (FIG. 11) so as to create descriptor element records of a document sheet or page from the document element records (FIGS. 20 to 24) of the sheet which is stored in the document element file storage 38.

Figure 26:
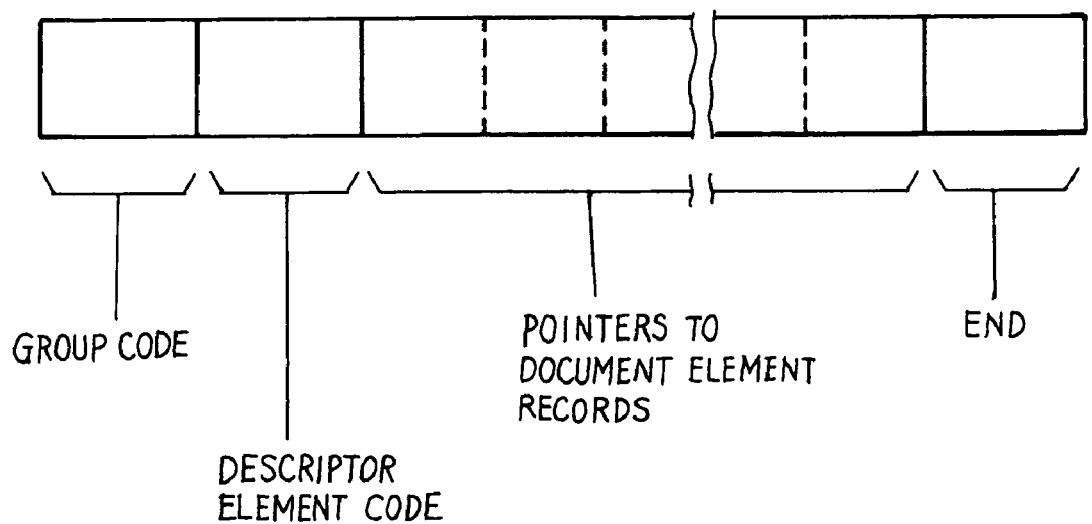
FIG. 26 shows a format of a descriptor element record in accordance with the system of the embodiment.

FIG. 26 shows a descriptor element record data format example. The descriptor element record includes a descriptor group code and a descriptor element code for identifying the descriptor element. In addition, the descriptor element record includes pointer(s) to point to document element record(s) which specify or constitute the descriptor element. For example a descriptor element record "DESIGNATE DOMAIN" for "[" includes a pointer to point to the document element record of the written signs "[" which specifies the descriptor element.

To create descriptor element records, the system first searches for those document element records having a specific qualifier, e.g., a red color qualifier. In the search, if a written sign "[" has been found, the system searches for another written sign "]" to be paired therewith, thus identifying written signs "[ ]" which are indicative of the descriptor element "DESIGNATE DOMAIN." A descriptor group code and a descriptor element code have now been determined, and pointers to point to the document element (graphical element) records of "[" and "]" in the document element file storage have also been determined.

The descriptor element records of a source document sheet from the create descriptor elements block 42 are stored into the storage 44 as a descriptor element subfile under the management of sheet data storage block 35.

Then, the create descriptors block 46 creates or constructs descriptor records of a source document sheet or sheet group according to the association or syntax rules stored in the association rule base storage 45. The create descriptors block 46 creates such descriptor records from the descriptor element records (FIG. 26) stored in the descriptor element file storage 44 and from the document element records (FIGS. 20 to 24) stored in the document 10 element file storage 38 while looking up the group attribute file 50 storing the group attribute specifiers (FIG. 11).

Figure 27:
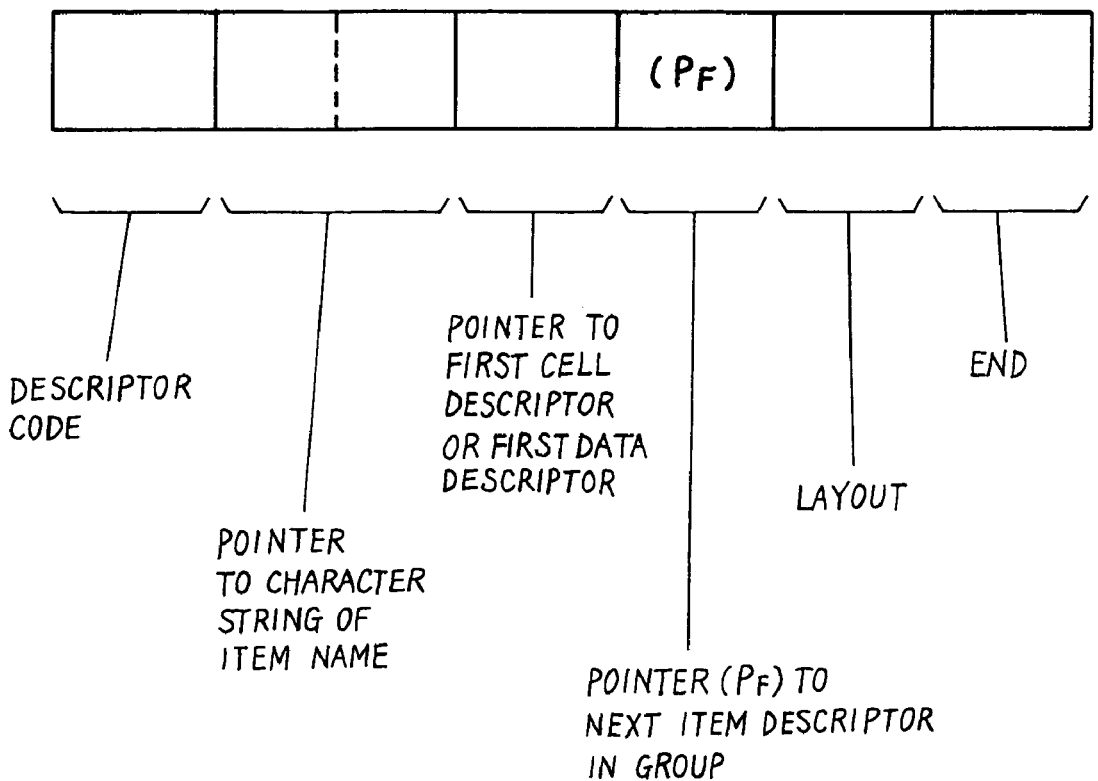
FIG. 27 shows a format of an item descriptor in accordance with the system of the embodiment.
Figure 33:
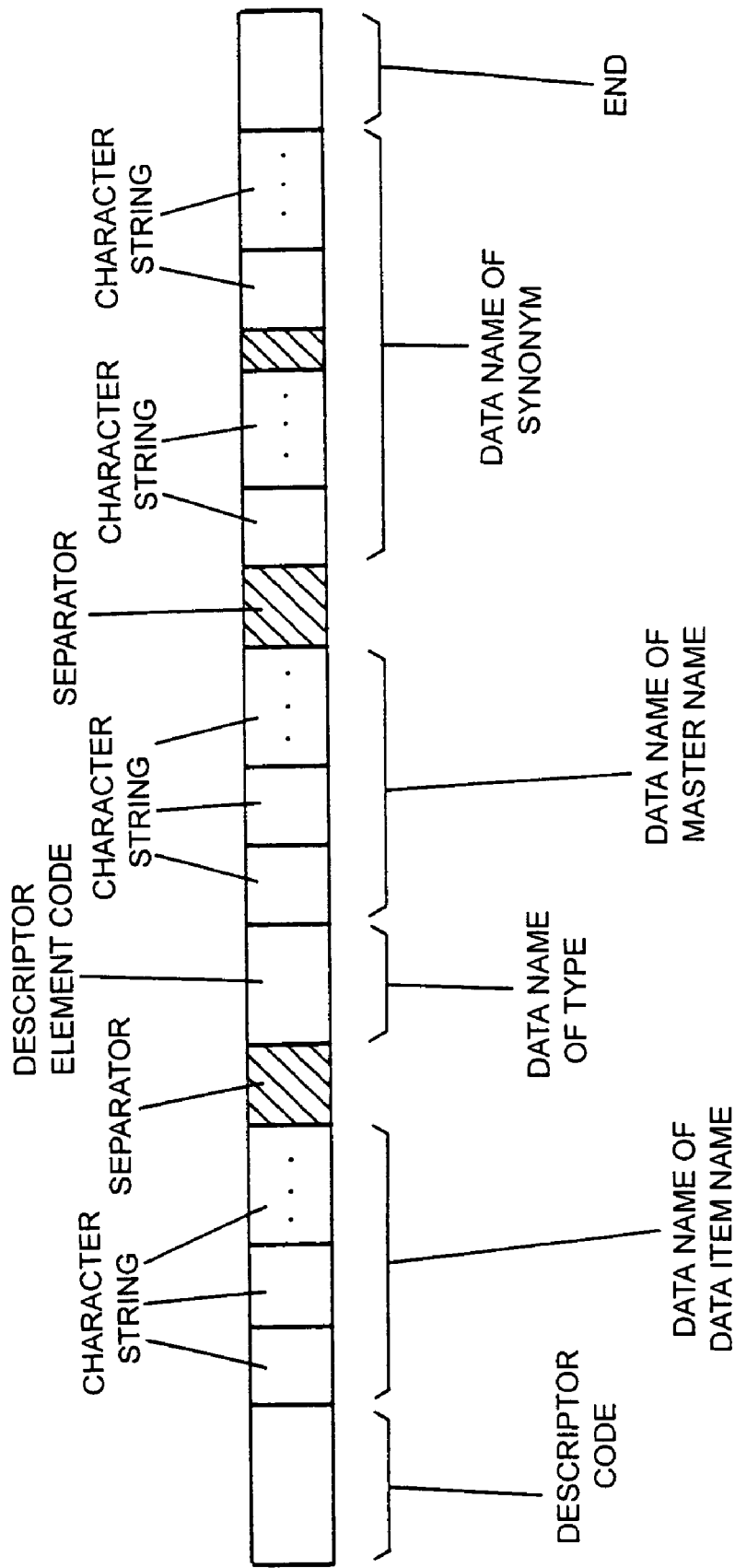
FIG. 33 shows a data format of a data definition descriptor in accordance with the system of the embodiment.

From the data definition sheet (FIG. 14), as will be detailed below the following descriptors are created: item descriptor (FIG. 27); item descriptor chain (FIG. 28); cell descriptor (FIG. 29); cell descriptor chain in a field (FIG. 30); cell descriptor chain in a record (FIG. 31); and data definition and descriptor (FIG. 33).

The cell descriptor (FIG. 29) is created as follows. The system searches through table ruled lines for those document elements that represent a cell (data entry cell), thus identifying a cell. The location of the cell, a pointer to the next cell descriptor in the same field, and a pointer to the next cell descriptor in the same data record are recorded in a cell descriptor. The system checks if the cell contains a character string by using the document element file. If the cell does contain a character string, a pointer to a character string in the cell (document element record) is recorded in the cell descriptor.

The system also finds a cell string which is delimited or demarcated by a blue colored field sign "[ ]", thereby identifying a field. Then, the system checks if a character string enclosed by a blue colored item sign "< >" is located by the field in the direction of the field or if it is connected to the field by a blue colored link sign "–". If such a character string is found, the system identifies it as the data item name of the field according to an association rule, thereby creating an item descriptor (FIG. 27) and a cell descriptor chain in the field (FIG. 30).

The system also finds a cell string which is normal to the field, identifies it as a cell string in the same data record, and creates a cell descriptor chain in the record (FIG. 31). The system also creates an item descriptor chain (FIG. 28).

In this manner, the create descriptor block 46 (see FIG. 25) in the present system uses association algorithms stored in the association rule base 45 to combine a plurality of unitary descriptors which are recognized from a plurality of written signs of descriptor elements into a composite or complex descriptor. Further, the create descriptor block 46 recognizes a more complex descriptor from either a combination of the plurality of unitary descriptors and a composite descriptors, or from a combination of composite descriptors, and thereby creates the required descriptor data for defining the respective descriptor contents.

Figure 32:
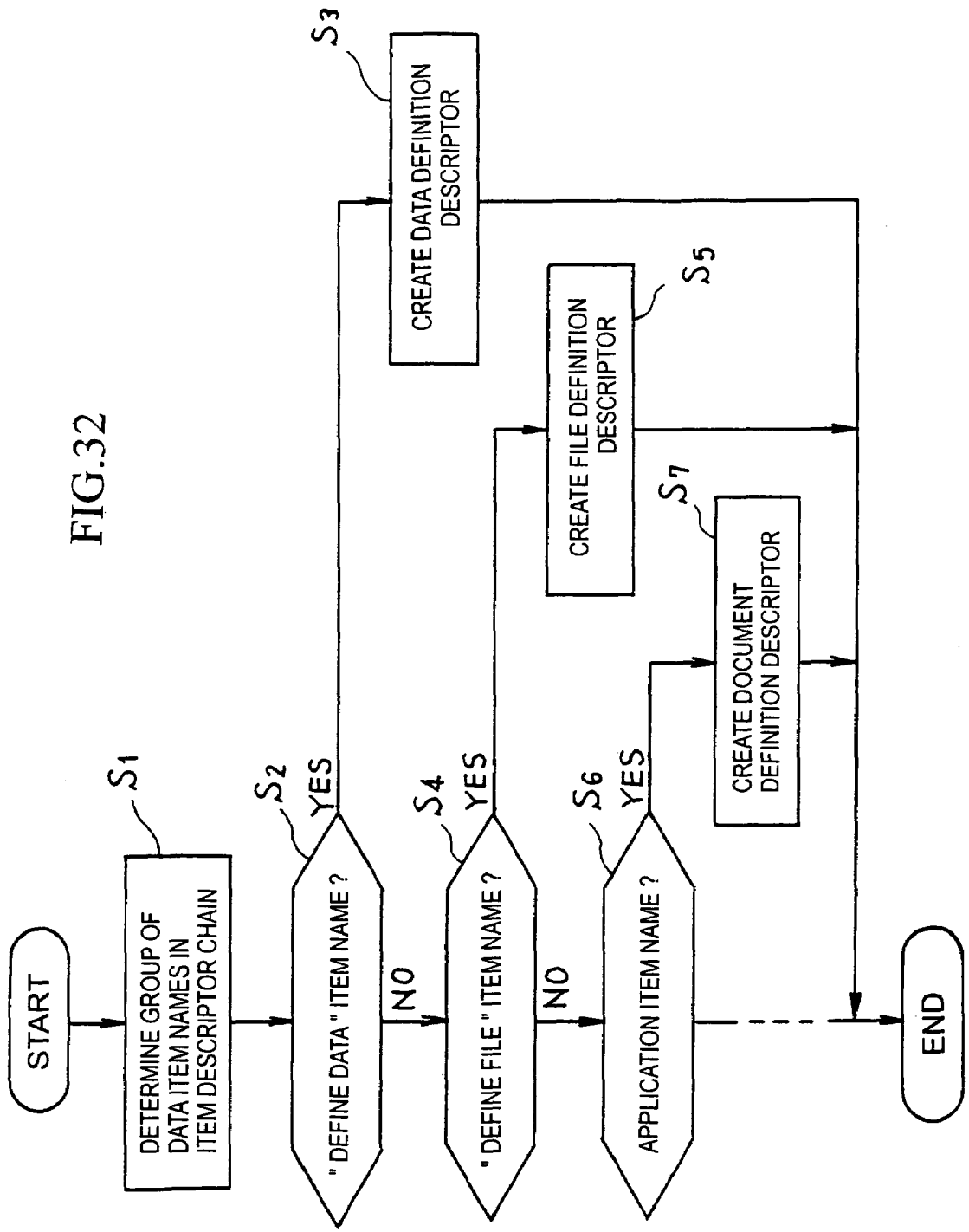
FIG. 32 is a flow chart of an overall process in which respective definition processes of "create data definition descriptor", "create file definition descriptor" and "create document definition descriptor" are selectively called based on a data item descriptor chain in accordance with the embodiment.

Having created an item descriptor chain (FIG. 28), the system enters a routine (process) as shown in the flowchart of FIG. 32, and determines or identifies a group of data item names in the chain (step S1).

In the present example, data item name character strings "DATA ITEM NAME", "TYPE", "MASTER NAME" and "SYNONYM" are each encircled by a blue colored written sign "O" for DESIGNATE DESCRIPTOR ELEMENT. Thus, the system looks up the descriptor element file 44 and finds that these data item names pertain to the "DEFINE DATA" group.

Having found this (step S2), the system enters "CREATE DATA DEFINITION DESCRIPTORS" (step S3).

The "CREATE DATA DEFINITION DESCRIPTOR" block looks up cell descriptor chains in the record to sequentially read cell strings or records which are normal to a field so as to determine whether a data name character string in each cell has been registered in the system. For a registered data name character string (in the present example, data names "TEXT", "NUMERIC" and "SUM NUMERIC" are registered for data item "TYPE"), a code having a fixed length is set in a data definition descriptor (FIG. 33). For an unregistered data name character string (in the present example, data names of "DATA ITEM NAME", "MASTER NAME", "SYNONYM" are not registered), a variable length code string of the character string is set in a data definition descriptor (FIG. 33). As a result, the system creates data definition descriptors for the respective records.

From the data definition sheet (FIG. 14), the present system creates a plurality of data definition descriptors (FIG. 33) for as many as the record lines of the definition table. A set of the data definition descriptors defines a data name dictionary which provides registered data names for respective data item names which are available in the application.

As stated above, the present system can easily set up the data definition as a basic procedure for application configuration by entering familiar characters, symbols and/or graphicals in a document. This feature not only releases the burden of system operators such as system engineers but also allows application software users (end users) to take part in the data definition.

File definition will now be described. In general, the file definition is set up each time when an individual file is registered or set in the system. For instance, when a file "SALES BY MONTHS" is registered or set in the system, a corresponding file definition is set up using a file definition sheet, such as the one shown in FIG. 34. Similarly, the file definition sheet is a sheet with a colored background sheet on which black colored document contents are recorded. The file definition sheet (FIG. 34) provides a table of 3×5 matrix cells (data entry cells) in which the top row presents respective application data item names which are registered by the data definition sheet (FIG. 14), the middle row presents respective field names (access names) which are preset in the system, and the bottom row presents respective field lengths of the data names of the data item names.

Specifically, the application data item names "MONTH", "CLASS", "ARTICLE CODE", "UNIT PRICE" and "SALES QUANTITY" correspond to field names "MON", "BUN", "HIN", "TAN" and "SUU", respectively. These fields have lengths of 5 (bytes), 20 (bytes), 20 (bytes), 5 (bytes) and 5 (bytes), respectively. The file definition is also a white colored background sheet on which black colored document contents are recorded.

Like the data definition sheet (FIG. 13), the file definition sheet (FIG. 34) is a definition sheet carrying ordinary writings that are suitable for human perception. Thus, should the present system directly read contents of the file definition, it recognizes the contents as document information per se rather than as file definitions.

Figure 35:
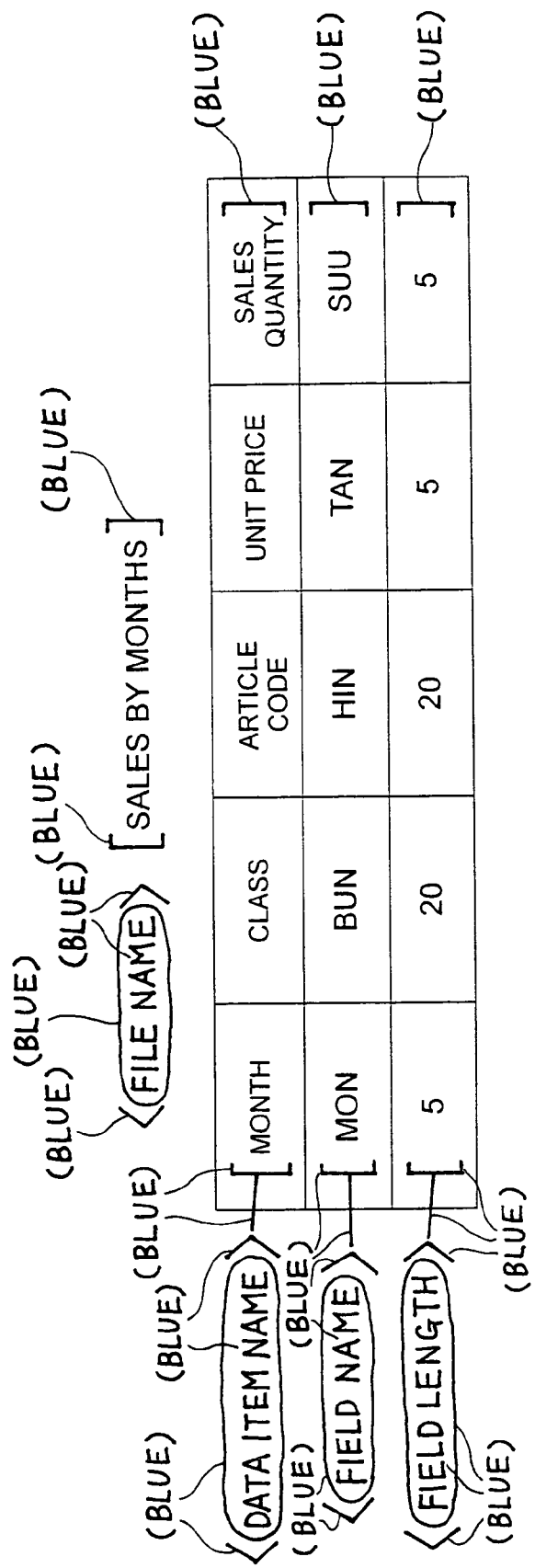
FIG. 35 is a view of the file definition sheet in FIG. 34 in which written signs for helping or enabling a file definition have been entered.

To enable the present system to successfully recognize the file definition contents from the file definition sheet so as to be suited for human perception, blue colored written signs of definition helping information in the "COMMON" and "DEFINE FILE" groups are added, as shown in FIG. 35.

In FIG. 35, required definition helping or enabling information has been entered to define the table of the file definition sheet as an item definition.

Specifically, each field horizontally extending in the table is denoted by a blue colored written sign "[ ]" of the descriptor element for DESIGNATE DOMAIN. The table does not show data item names as an attribute of the respective fields. Thus, in a space outside of and extending from respective fields, blue colored character strings of data item names "DATA ITEM", "FIELD NAME" and "FIELD LENGTH" are entered as definition helping information.

Then, the added data item name character strings in the blue "DATA ITEM", "FIELD NAME" and "FIELD LENGTH" are enclosed by blue colored written signs of descriptor elements "O" for DESIGNATE DESCRIPTOR ELEMENT, parenthesized by the blue colored written signs of descriptor elements "–" for "ITEM", and connected to corresponding fields by the blue colored written signs of descriptor elements "–" for LINK. To register the title of the document "SALES BY MONTHS" as a file name, the title character string "SALES BY MONTHS" is blanketed by a blue colored written sign "[ ]" for DESIGNATE DOMAIN. By the title, a data item name "FILE NAME" is written in blue. The data item name character string "FILE NAME" is encircled by a blue colored written sign "O" for DESIG- NATE DESCRIPTOR ELEMENT and parenthesized by a blue colored written sign "< >" for ITEM.

Like the data definition sheet (FIG. 13), the file definition sheet (FIG. 35) with additional information for helping or enabling the present system to recognize the definition is entered into the system via the color image scanner 10. Then, by using the subsystems (FIGS. 19, 28) as described above, the present system processes contents of the file definition sheet (FIG. 35) with the definition helping or enabling information. The process involves (1) recognizing document elements (characters, graphicals, etc.) (2) correcting document elements (characters, graphicals, etc.) (3) recognizing descriptor elements (create descriptor element data), and (4) interpreting definition contents (create definition descriptor data).

Figure 29:
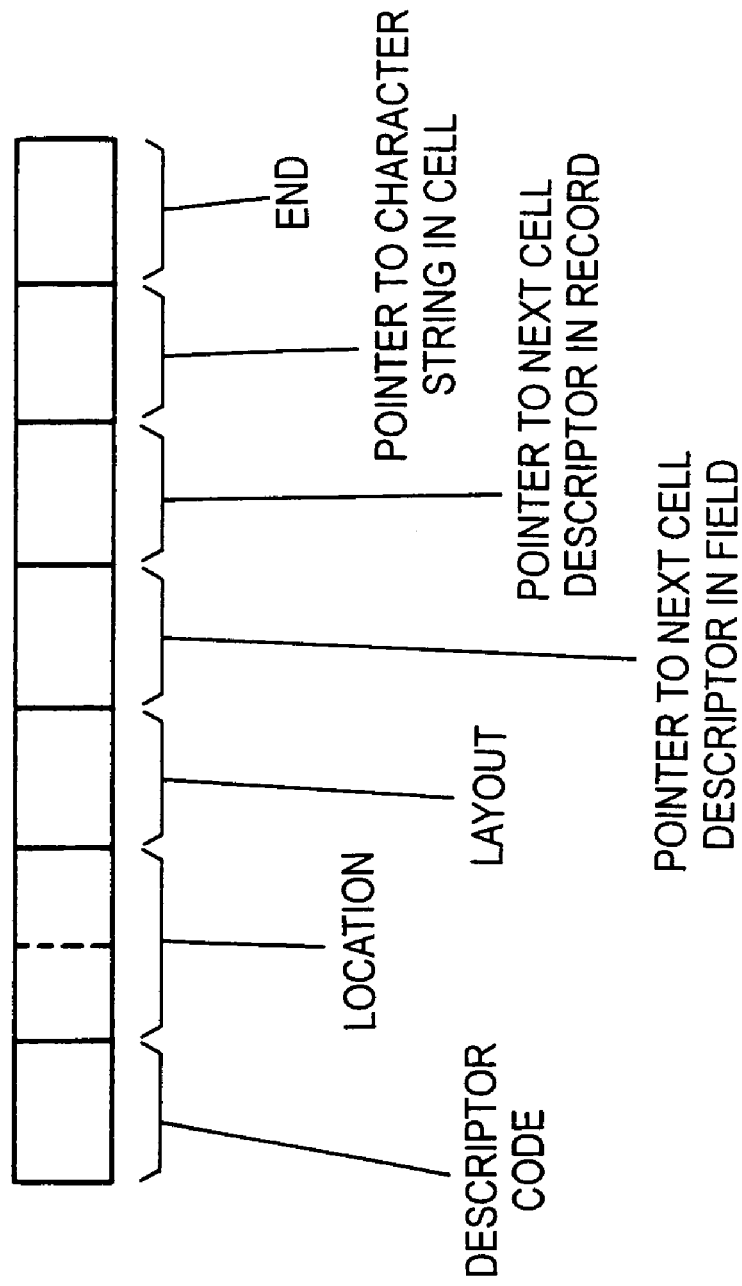
FIG. 29 shows a format of a cell descriptor in accordance with the system of the embodiment.
Figure 37:
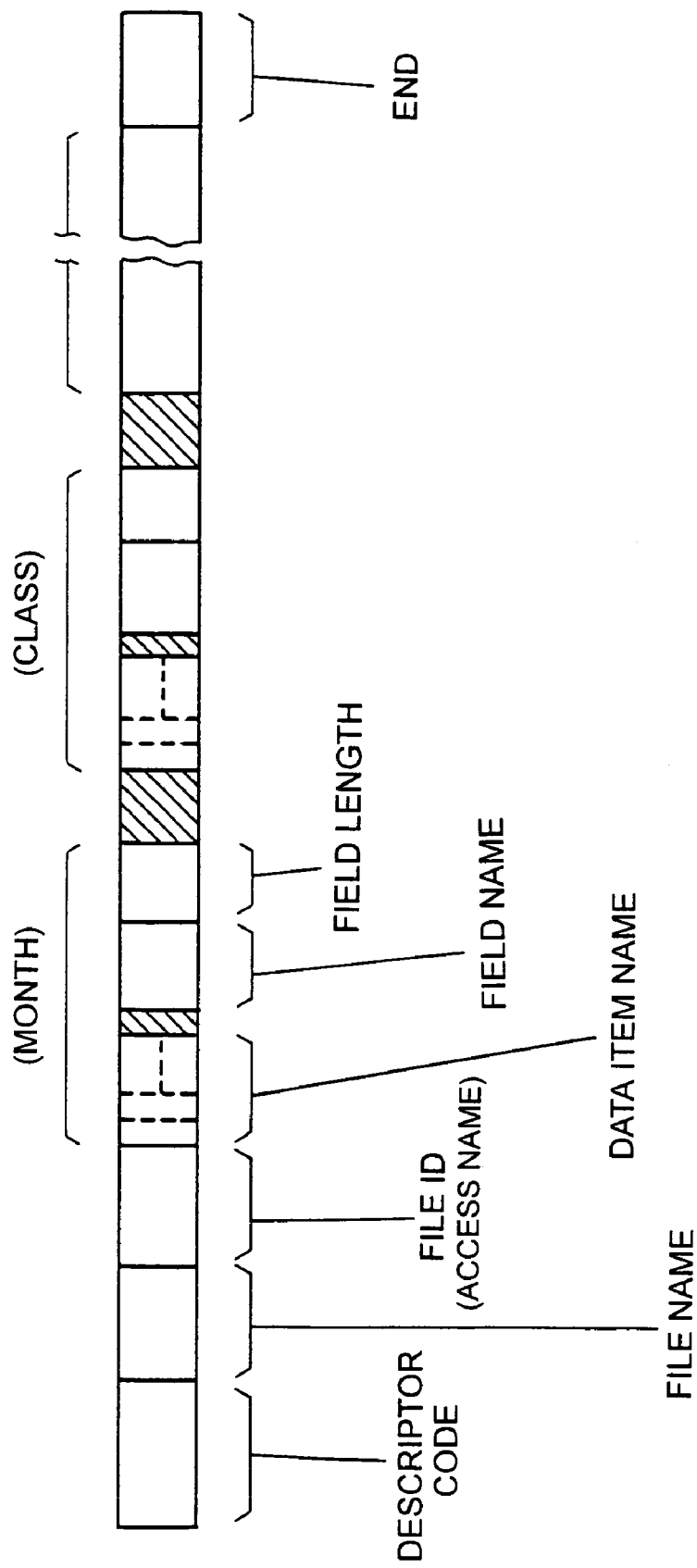
FIG. 37 shows a data format of a file definition descriptor in accordance with the system of the embodiment.

From the definition information involved in the file definition table, the following definition descriptors are created: ITEM DESCRIPTOR (FIG. 27), ITEM DESCRIPTOR CHAIN (FIG. 36); CELL DESCRIPTOR (FIG. 29); CELL DESCRIPTOR CHAIN IN FIELD (FIG. 30); CELL DESCRIPTOR CHAIN IN RECORD (FIG. 31); and FILE DEFINITION DESCRIPTOR (FIG. 37). In the case of the present file definition table, the cell string in the field extends horizontally, whereas cell strings in the record extend vertically. From the definition information involved in the title "SALES BY MONTHS", a single item descriptor (FIG. 27) having the data item name of "FILE NAME" is created.

Having created item descriptor chains (FIG. 36) corresponding to the data item names "DATA ITEM NAME", "FIELD NAME" and "FIELD LENGTH" of the file definition table, the present system enters the process shown in the flowchart of FIG. 32, and identifies the group of data item names included in the item descriptor chain (step S 1).

The data item name character strings "DATA ITEM NAME", "FIELD NAME" and "FIELD LENGTH" are each surrounded by a blue colored written sign "O" for DESIGNATE DESCRIPTOR ELEMENT. By looking up the descriptor specifier file 48, the system finds that these character strings have been registered as data item names pertaining to "DEFINE FILE."

Having found this (step S4), the system enters CREATE FILE DEFINITION DESCRIPTOR (step S5).

The CREATE FILE DEFINITION DESCRIPTOR block retrieves cell strings (horizontally extending records in the present examples normal to fields, using cell descriptor chains in the record, and determines whether a data name character string in each cell has been registered in the system.

In the present example, the data names of DATA ITEM NAME in the application, "MONTH", "CLASS", "ARTICLE CODE", etc. have been registered in the data name dictionary or DATA DEFINITION DESCRIPTORS (FIG. 33) in the form of variable length character code strings. The data names of the FIELD NAME, "MON", "BUN", "HIN", etc. have been registered in the system as FIELD NAMES (access names) in the form of fixed length codes. The data names of the FIELD LENGTH, "5", "20", "20", etc. can be converted into fixed length numeric data.

In the manner as described, the present system identifies character code strings, fixed data or codes corresponding to data name character strings for DATA ITEM NAME, FIELD NAME or FIELD LENGTH on a record-by-record basis, and sets the results in the FILE DEFINITION DESCRIPTORS for all of the records.

From the item descriptor of the title "SALES BY MONTHS", the system sets the character code string of the FILE NAME, and also sets the FILE ID (ACCESS NAME) to access the file "SALES BY MONTH" stored in the system (see FIG. 37). The FILE ID (ACCESS NAME) refers to a file identification code which corresponds to the FILE NAME entered by a user and which is automatically assigned by the system.

FIG. 38 shows the file management in the present system. Files A, B, C, etc. reside somewhere in the file storage areas of the internal or external storage 16,18. The index table (file management data) for retrieval of the files resides in predetermined areas of the internal or external storage 16,18. The file manager (file managing program) looks up the index table to access the respective files. An external access to the file manager is obtained with the FILE ID (ACCESS NAME).

As stated above, with the present system, an operator readily sets up the file definition that is required for file registration by entering familiar characters, symbols or graphicals in a document. This not only relieves the burden of system operators but also allows end users to take part in the file definition.

The document making feature of the present system of the embodiment is now described. With the present system, users, in particular, end users can easily make desired documents.

By way of example, FIG. 39 shows a document sheet in which basic items of a ledger "SALES BY MONTHS" have been entered by hand-writing. Any of the entered characters, symbols or graphicals is an ordinary writing that is representative of document contents which is written in the same color, black, for example.

In the table of the document sheet, the top row is the item name entry row 20 containing data item names "ARTICLE NAME", "SALES QUANTITY", "UNIT PRICE" and "SALES", and there is one data item name per cell (entry cell).

Two data entry blocks (fields) are allocated to "ARTICLE NAME", whereas a single data entry field is allocated to any of the other data item names "SALES QUANTITY", "UNIT PRICE" or "SALES." Data names of "CLASS" and "ARTICLE CODE" (e.g., "TV SET", "J1020") are entered in the fields of "ARTICLE NAME." The other fields are blank.

Above the table, a document title "SALES BY MONTH" is entered. At the right corner, annotations "KANDA BRANCH OFFICE" and (the year of) "1995" are written.

Then, a user may use a color writing instrument or the like to enter in written signs for helping or enabling the definition in the document, as shown in FIG. 40.

A specific color is assigned as a qualifier of descriptor written signs and additional written information. In the present example, the written signs for helping or enabling the definition in the groups of "COMMON" and "COMMAND/PROCEDURE" are entered in blue.

In the table of FIG. 40, a blue colored descriptor written sign "[ ]" for DESIGNATE DOMAIN is entered in the top and bottom cells in a vertical cell string, which is thus defined as a field.

Blue colored written signs for helping or enabling the definition "<CLASS>" and "<ARTICLE CODE>" are entered in a space above and on the left side of the table. These data item name character strings are connected to the two fields of the "ARTICLE NAME" data item name by a blue colored LINK "-." The black colored data item name character string "ARTICLE NAME" is not associated with any blue colored written sign for helping or enabling the definition. Thus, the two fields extending under the "ARTICLE NAME" are defined as corresponding to blue colored data item names "CLASS" and "ARTICLE CODE", respectively.

In cells to the right of the "ARTICLE NAME" cell, data item name character strings "SALES QUANTITY", "UNIT PRICE" and "SALES" are each parenthesized by a blue colored descriptor written sign "< >" for ITEM into <SALES QUANTITY>, <UNIT PRICE> and <SALES QUANTITY>. As a result, the "SALES QUANTITY", "UNITPRICE" and "SALES" data item name character strings are each defined as a data item name.

Blue colored written signs "[ ]" for DESIGNATE DOMAIN define the fields extending below these data item names "<SALES QUANTITY>", "<UNIT PRICE>" and "<SALES>."

A black colored annotation "KANDA BRANCH OFFICE" at the top right of the table is enclosed by blue colored descriptor written sign "{ }" for EXCLUDE. This written sign explicitly defines excluding the annotation from the descriptors. Just under the annotation, a blue colored composite descriptor written sign "☐-<MONTH>" is entered. The composite descriptor comprises a descriptor written sign for FIELD (DATA ENTRY FIELD), a descriptor written sign "< >" for ITEM, a data item name character string "MONTH" and a descriptor written sign "–" for LINK. This defines the area (field) specified by "☐" as a data entry field for receiving data of the data item <MONTH>.

In a black colored annotation "SALES=UNIT PRICE× SALES QUANTITY" below the table, the data item name character strings "SALES", "UNIT PRICE" and "SALES QUANTITY" are each blanked by "< >". This defines the arithmetic formula of the annotation (ordinary writing) as an arithmetic formula under data management.

In another annotation "(NOTE) OUTPUT FROM SALES BY MONTHS", the file name "SALES BY MONTHS" is parenthesized by a blue colored descriptor written sign "[ ]" for DESIGNATE DOMAIN, and predicate words "OUTPUT" and "FROM" are each surrounded by a blue colored descriptor written sign "O" for DESIGNATE DESCRIPTOR ELEMENT.

A blue colored data item name "<FILE NAME>" is entered near the file name character string "SALES BY MONTH" specified by the blue colored DESIGNATE DOMAIN sign "[ ]", and is connected to the latter by a blue colored LINK "–". As a result, the file name "SALES BY MONTHS" is defined as ITEM. The ordinary writings "FROM" and "OUTPUT" are defined as written signs for descriptor elements "SENDER" and "OUTPUT", respectively, in the group of "COMMAND/PROCEDURE." As a result, this defines a command which requests output data be provided to the document from the file "SALES BY MONTHS" (sender operand).

The document having additional information (FIG. 40) for helping or enabling the definition is likewise entered into the present system via the color image scanner 10.

Then, the present system processes the contents of the file definition sheet with the information for helping the definition (FIG. 35) by the subsystems (FIGS. 15,25) in the manner as described. The process involves (1) recognizing document elements (characters, graphicals etc.,), (2) correcting document elements (characters, graphicals, etc.), (3) identifying descriptor elements (create descriptor element records), and (4) interpreting descriptor contents (create descriptor data).

As a result, item descriptors (FIG. 27), item descriptor chain (FIG. 41), cell descriptors (FIG. 29), cell descriptor chains in the field (FIG. 30) and cell descriptor chains in the record (FIG. 31) are created from the information involved in the table. In the case of the present table, the field cell string extends vertically, whereas the record cell string extends horizontally.

A single item descriptor (FIG. 27) having a data item name of "MONTH" is created from the information "☐—<MONTH>" entered at the right corner above the table (FIG. 40).

Figure 42:
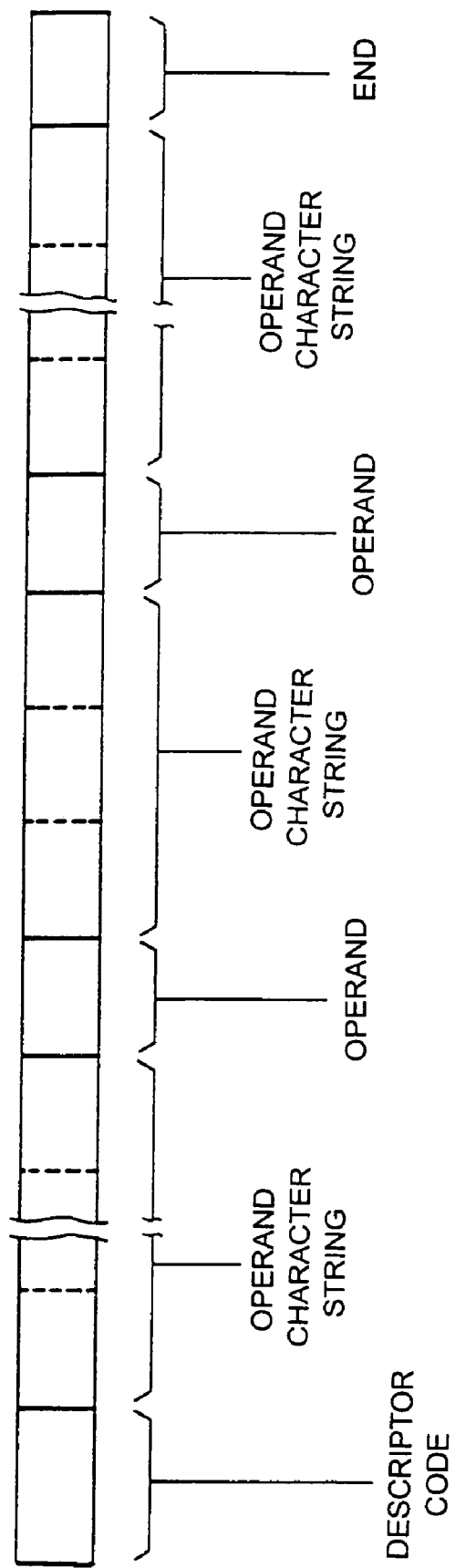
FIG. 42 shows a data format of an arithmetic descriptor in accordance with the system of the embodiment.

An arithmetic descriptor (FIG. 42) is created from the information about the annotation "SALES=UNIT PRICE× SALES QUANTITY" entered in a right space below the table (FIG. 40).

Further, the system creates a document management descriptor (FIG. 45) for managing the descriptors of the table (item descriptor, item descriptor chain, arithmetic descriptor, etc.).

The system creates a data output command descriptor (FIG. 46) from the information pertaining to the annotation "(NOTE) OUTPUT FROM SALES BY MONTHS" entered in a left space below the table (FIG. 40).

Having created the item descriptor chain including the data item names "CLASS", "ARTICLE CODE", "SALES QUANTITY", "UNIT PRICE" and "SALES", the system enters the process of FIG. 32, and identifies the group of the data item names (step S1), as in the cases described above.

In the present example, the data item name character strings "CLASS", "ARTICLE CODE", "SALES QUANTITY, "UNIT PRICE" and "SALES" have been registered in the data name dictionary or data definition descriptors (FIG. 33). The table is thus found to be an application definition sheet (document). Having found the table to be a document (step S6), the system enters "CREATE DOCUMENT DEFINITION DESCRIPTOR" (step S7).

The CREATE DOCUMENT DEFINITION DESCRIPTOR block not only recognizes descriptors involved in the table, i.e., item descriptor, item descriptor chain, cell descriptor, cell descriptor chain in the field and cell descriptor chain in the record, but also recognizes descriptors from the descriptor written signs which are entered in the same sheet or page and which are connected or not connected to the table by LINK "—", as construction data of the same document, and manages all such descriptors by a document management descriptor. The document management descriptor is management data which manages document definition descriptors that constructs a single, logical document.

Figure 45:
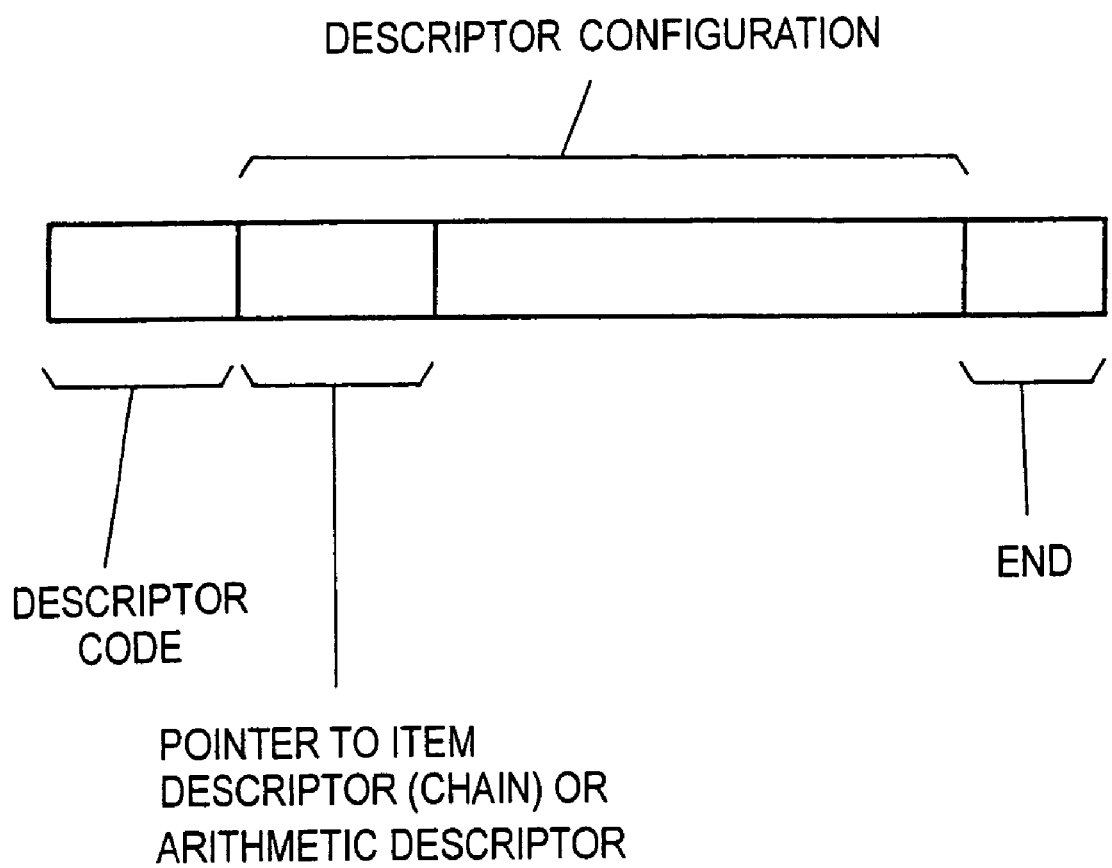
FIG. 45 shows a data format of a document management descriptor in accordance with the system of the embodiment.

In the present example, a single item descriptor created from the information "☐—<MONTH>" is also recognized as document related descriptor (construction data) which is thus pointed to by the document management descriptor (FIG. 45).

Characters or symbols "=" and "×" in the annotation below the table "<SALES>=<UNIT PRICE>×<SALES QUANTITY>" are each recognized as having the meaning according to the registration (here, the operation symbol of "=", "×") since such characters or symbols satisfy the following conditions (1) an inserted character or symbol exists between a plurality of character strings <SALES>, <UNIT PRICE>, <SALES QUANTITY>, and are parenthesized by blue colored ITEM "< >"; and (2) the inserted character or symbol has been registered in the descriptor specific file 48 or the application dictionary 52.

With the recognized results, the system creates the arithmetic descriptor (FIG. 42) that defines the annotation's arithmetic formula "<SALES>=<UNIT PRICE>×<SALES QUANTITY>". The arithmetic descriptor is also a document definition descriptor of the document so that it is pointed to by the document management descriptor (FIG. 45).

FIG. 43 illustrates the application dictionary 52 with term entries. For each term entry group "UNIT", "ARITHMETIC", and "SUM", available terms of characters, character strings and symbols are registered.

Figure 44:
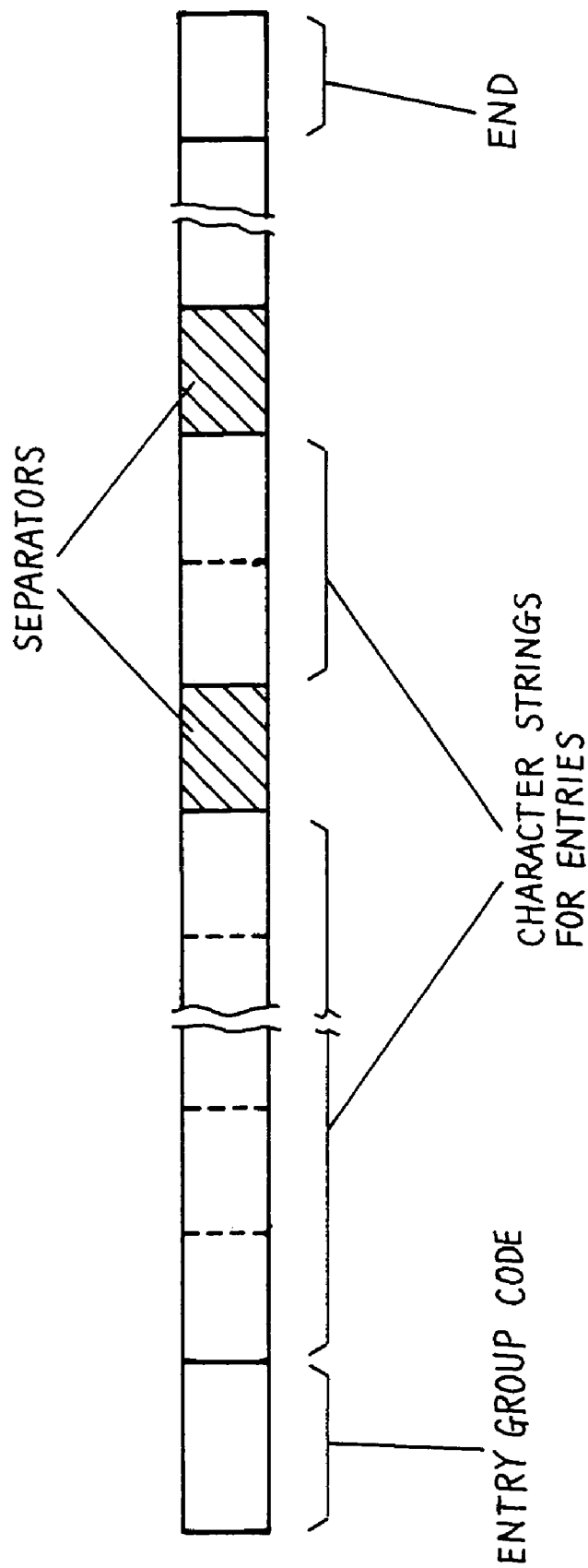
FIG. 44 is a data format of a dictionary term entry record in accordance with the system of the embodiment.

FIG. 44 illustrates a data format of a term entry in the application dictionary 52. The header data field of ENTRY GROUP CODE is set to the code of an entry group code ("UNIT", "ARITHMETIC" "SUM", etc.). The data fields "CHARACTER CODE STRINGS" following the header are set to a list of character code strings constructing characters, character strings and/or symbols pertaining to the entry group. Separators correspond to commas "," in FIG. 43, which separate between entry terms.

With respect to the descriptor written signs of the annotation indicated below the table, "(NOTE) OUTPUT FROM SALES BY MONTHS", the character strings "FROM" and "OUTPUT" surrounded by "O" have been registered as descriptor elements "SENDER" and "OUTPUT DATA", respectively. Thus, the system recognizes these descriptor elements as a command requesting output data from a data sender or source, and creates a data output command descriptor (FIG. 46).

In the process of creating a data output command, the system identifies the sender operand and the receiver operand. In the present example, item descriptor information "<FILE NAME> SALES BY MONTHS" is regarded as the sender operand indicated by the descriptor element "FROM" in the group of COMMAND/PROCEDURE according to the association rules stored in the association (syntax) rule base 45.

There exists no explicit descriptor information which specifies the receiver operand. Thus, the system selects the default rule by which a descriptor data 25 created from other descriptor information on the same sheet or page are looked up. In the present example, the system looks up the document descriptor data or document management descriptor (FIG. 45) that have been created, and the system determines the document field or record (data entry one) specified by these descriptors as the receiver operand.

Figure 46:
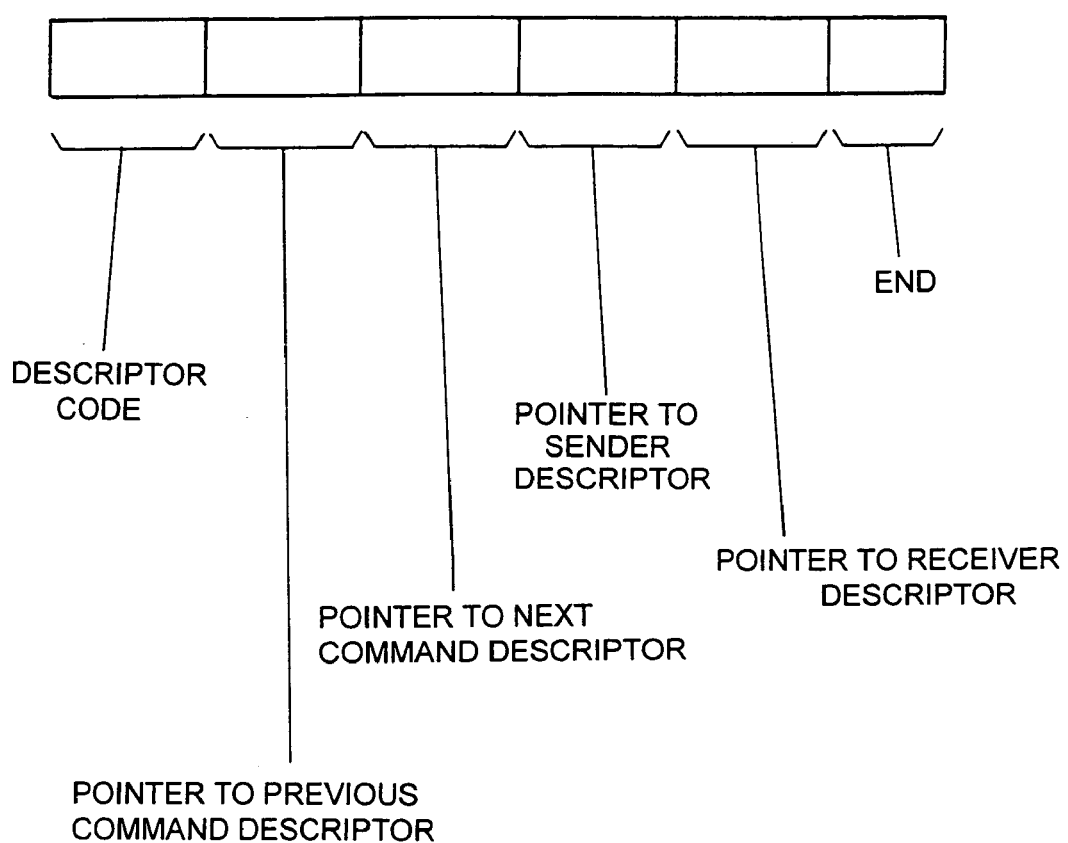
FIG. 46 shows a data format of a data output command descriptor in accordance with the system of the embodiment.

The sender operand and the receiver operand determined in this manner are then pointed to by the data output command descriptor (FIG. 46). When the system has found a plurality of commands within a predetermined document domain (e.g., the same sheet or sheet group), though not shown in the present example, the system determines the executing order (sequence) of the corresponding command descriptors and records pointers to the previous and next command descriptors in each command descriptor.

Having created all descriptor data with respect to the entered documents with the descriptor written signs (FIG. 40), the system displays the results of the process, in particular, the recognition (characters/graphicals recognition, correction of location/size, etc., determination of definition contents) for the user's confirmation.

In such a confirmation display mode, the system presents document images on the display screen on a sheet-by-sheet basis. For document image display, the output document image block 40 looks up document elements of each document sheet stored in the document element file 44 in the pattern dictionary 36, retrieves corresponding patterns, converts or composes them into bit-mapped image data according to an image scanning program, and outputs a corresponding video signal.

When contents of a document corresponding to the recognized results are 25 presented on the display screen 20a, a user may operate the keyboard 12, mouse 14 or digitizer 15 to correct the document on the screen or enter new writing information.

The input characters and graphical elements block 37 directly creates document element records from the writing information entered by the keyboard without the need for characters/graphicals recognition. The input characters and graphical elements block 37 receives the written signs from the mouse 14 or digitizer 15, and causes the recognize characters and graphicals block 34 to recognize characters or graphicals from each written sign, thus creating document element records.

When it is desired to enter the definition or descriptor information using the input equipment 12, 14, 15 on a display-driven system, a user may set qualifiers of the respective descriptor groups in the specify descriptor group attributes mode (FIG. 8) in the system configuration.

With the display-driven system, a user may select the color of written signs either before or after entering the written signs. Specifically, before entering character strings or ruled lines, a user may choose a desired color button thereof from the color menu. In the alternative, after entering the character strings or ruled lines with the standard color, the user may specify a desired portion thereof on the screen and choose a desired color button for the desired portion.

In a definition submode, the system may respond to the entering of written signs from the screen so as to qualify the written signs according to the qualifiers which are preselected in the submode, and the system may display the results on the screen. In this case, the system recognizes the qualified written signs as definition or descriptor information.

In response to each written sign entered in the display screen, the input characters and graphical elements block 37 (FIG. 15) creates or updates a document element record corresponding to the entered written sign.

The written signs (character strings, symbols, graphicals) entered by the display screen are represented in the system by the document element records (FIGS. 20 to 24).

In a practical use, users may find it convenient to use the display-driven data entering method in combination with the image entering method stated above. Any written sign entered either by an image from a document sheet or by a command from the display screen is managed by the same data form of the document element record. Thus, any written sign, whether it be the original one (ordinary writing) initially written on a document or an additional one for definition, can be entered using either the image entering method or the display driven entering method.

After a document with contents thereon has been entered in the system via the image scanner and when it is displayed for confirmation, a user can add any desired written signs, and in particular, those for helping or enabling the document definition by operating the keyboard 12, mouse 14 or digitizer 15 while checking the displayed contents. Further, the user can enter commands from the display screen for a desired definition or for descriptors.

In addition, the user can change or cancel the descriptors that have been entered by performing desired edit-document operations on the corresponding written signs on the display screen.

Figure 47:
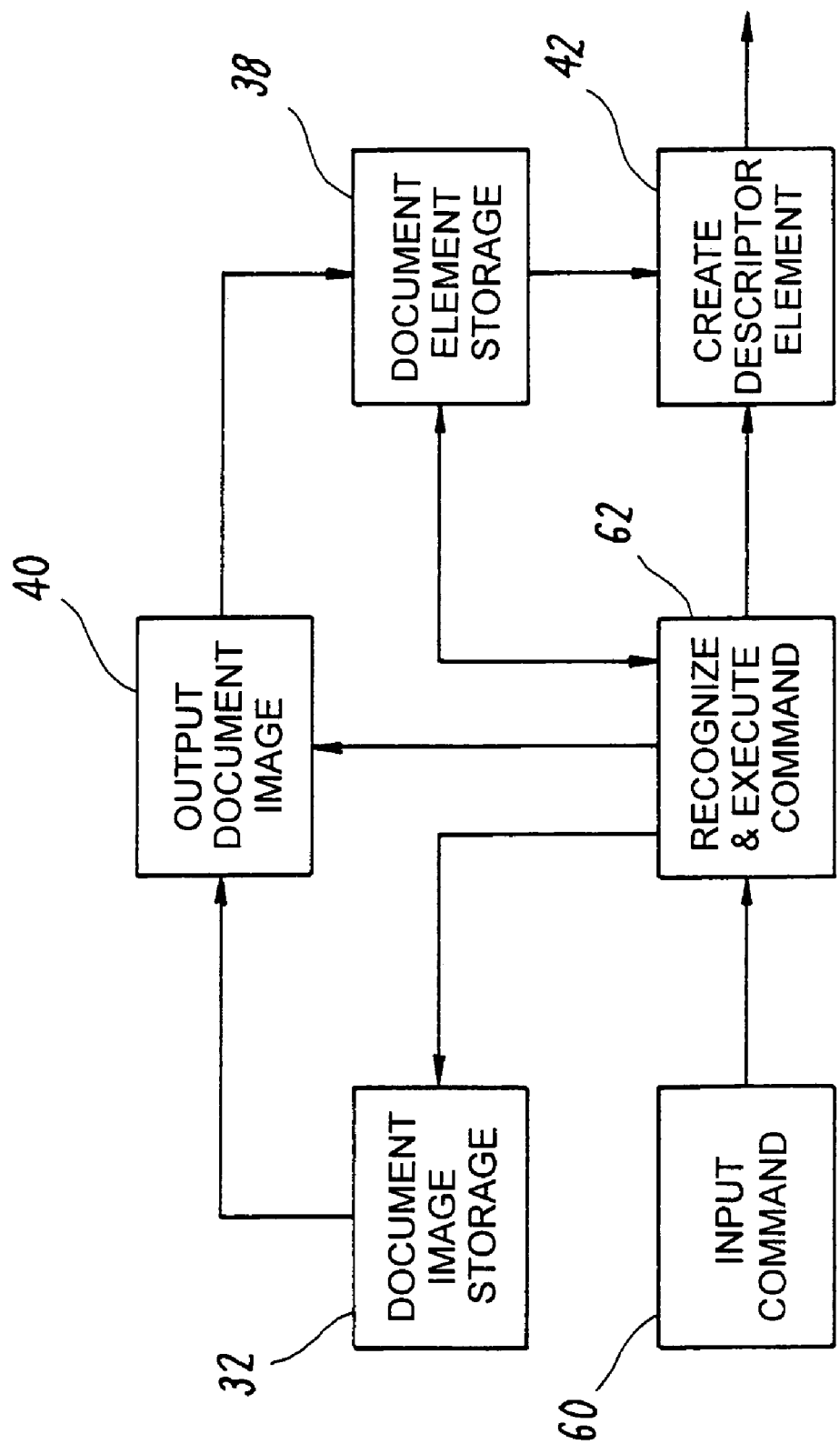
FIG. 47 is a block diagram of a subsystem for processing document written signs and descriptors entered by a display-driven system in accordance with the system of the embodiment.

To set descriptors using commands entered in the display driver system, the input command block 60 and the recognize and execute command block 62 are provided in the present system, as shown in FIG. 47. The input command block 60 receives a command entered by the keyboard 12, mouse 14 or digitizer 15. The recognize and execute command block 62 analyzes and picks the entered commands, thus creating, changing or cancelling descriptors as required. The input command block 60 and the recognize and execute command block 62 are realized by a command input program and a document making program, which are stored in the internal storage 16, and the CPU 24 which runs the programs.

The display-driven entering system or method may be applied to the data definition and the file definition as well.

The data output feature of the system of the embodiment which includes transferring data from a data file to an electronic document and outputting the results, is now described.

Figure 48:
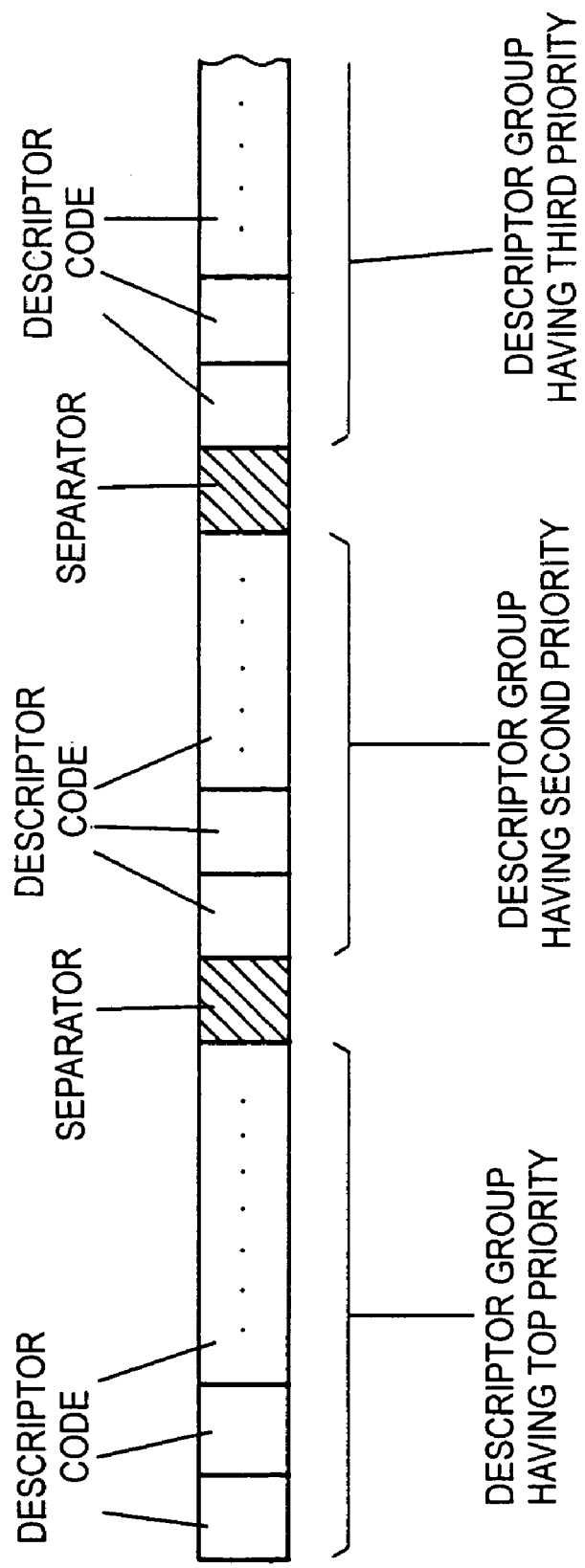
FIG. 48 shows a data format of a descriptor executing order rule base in accordance with the system of the embodiment.

In the present example, when the execute button is selected in the main mode, the execute descriptor block 74 (FIG. 49) executes definition contents of the command descriptors (those descriptors in the command group) that request desired system processing. Specifically, the execute descriptor block 74 retrieves the command descriptors from the descriptor file 54 and the sheet group definition storage 56 according to the descriptor group code, and determines the executing order of the retrieved command descriptors according to the descriptor executing order rule base (program or data). FIG. 48 illustrates a data format of the descriptor executing order rule base.

At first, the execute descriptor block 74 executes definition contents of the data output command descriptor. Specifically, the execute descriptor block 74 identifies command contents (data output) according to the descriptor group code. The execute descriptor block 74 determines the sender operand (file "SALES BY MONTH") using the file name of the item descriptor pointed to by the sender operand so as to retrieve the file definition descriptor. The execute descriptor block 74 identifies the receiver operand (ledger "SALES BY MONTHS") using the document management descriptor or the document definition descriptor pointed to by the receiver operand.

Figure 49:
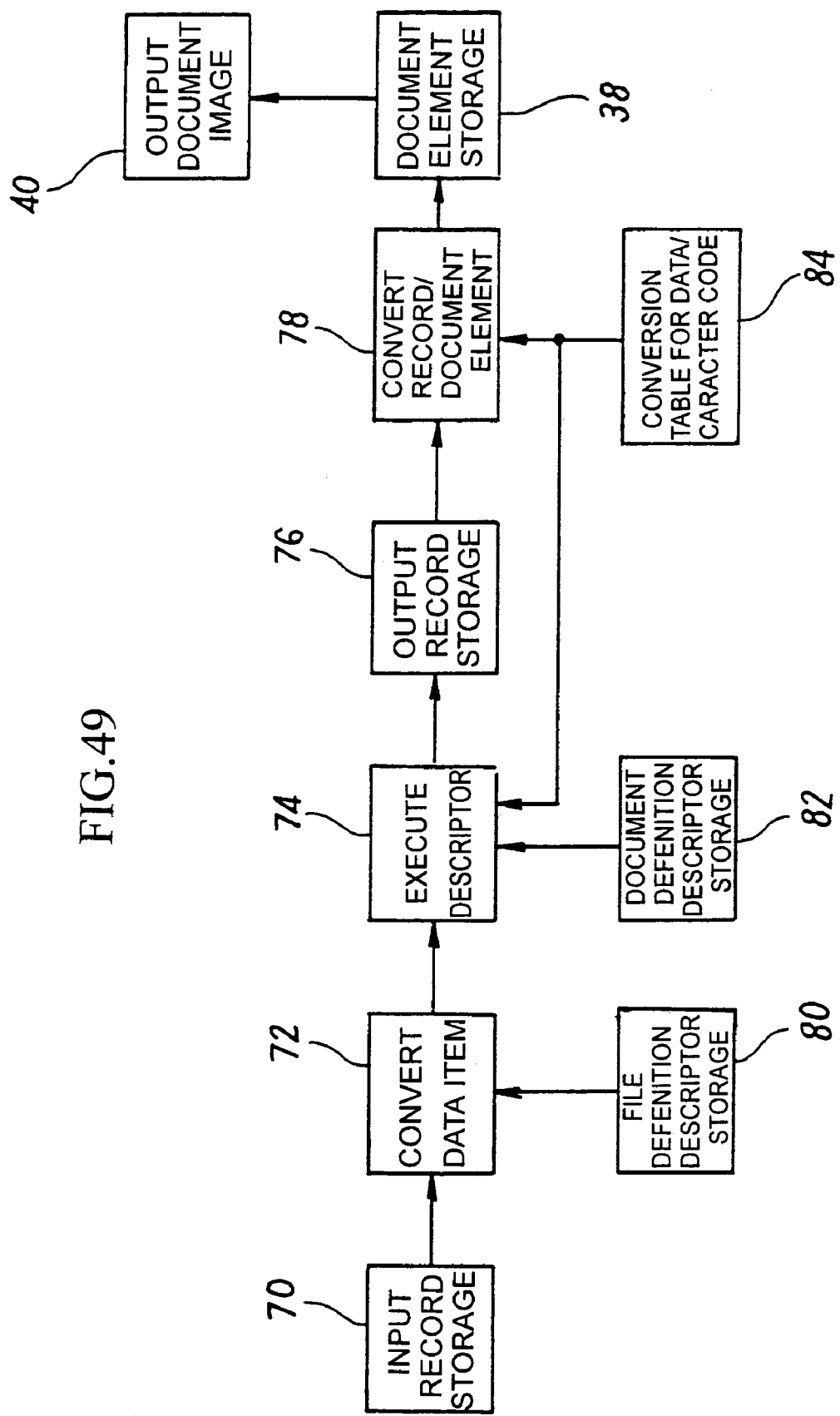
FIG. 49 is a block diagram of a subsystem for outputting a document in accordance with the system of the embodiment.

FIG. 49 shows the data output feature of the present system for outputting documents. The convert data item block 72, the execute descriptor block 74, and the convert record/document element block 78 are each implemented by the CPU 24 which runs the required converting or executing of the program. The input record storage 70, the file definition descriptor storage 80, the document definition descriptor storage 82, the output record storage 76, and the conversion table for data/character code 84 are realized by the internal or external storage 16, 18.

At the start of the data being output, the file manager (FIG. 38) transfers the file records from the sender file (SALES BY MONTHS) to the input record storage 70 on a record-by-record or block-by-block basis.

FIG. 50 shows a format of a record management table and file data record from the sender file. The file data record that is entered into the input record storage 70 contains data items "BUN", "HIN", "TAN", etc. which are defined in the sender file.

The convert data item block 72 converts the respective data items of the entered file data records, "BUN", "HIN", "TAN", etc. into corresponding system data items "CLASS", "ARTICLE CODE", "UNIT PRICE", etc. (FIGS. 34 and 50) according to the file definition descriptor (FIG. 37) stored in the file definition descriptor storage 80.

The execute descriptor block 74 selects, from the converted file data records from the convert data item block 72, those of the specified month, October, for example, according to the month data field of file data records.

Then, the execute descriptor block 74 selects, from the file data records of October, those which have data names of "CLASS" and "ARTICLE CODE" specified in the receiver or destination document (ledger "SALES BY MONTHS"), as shown in FIG. 51.

To this end, the execute descriptor block 74 identifies the data name character strings ("TV SET", "J1020", etc.) corresponding to "CLASS" and "ARTICLE CODE" according to document element data (character string data) pointed to by the item descriptors of the document definition descriptor, converts the identified character strings to record data (codes) by using the conversion table 84 for the data/character code, and compares data names of the document records, other than sum items ("SALES QUANTITY", "SALES"), with those of the entered file records to see whether the data names of the document records and the data names of the file records all match. A data name not filed in either the document or entered file records, if any, ("UNIT PRICE" in the present example) is excluded from the comparison.

Then, the execute descriptor block 74 executes the document definition of the selected file data records according to document definition descriptors (arithmetic descriptor, etc.) stored in the document definition descriptor storage 82.

In the present example (the document of FIG. 40), the execute descriptor block 74 computes sales for each record by <SALES>=<UNIT PRICE>×<SALES QUANTITY> according to the arithmetic descriptor (FIG. 42), and sets the results in the file data record. Each file data record now contains all required data, as shown in FIG. 50. The file data records are set in the output record storage 76 after the operation of the execute descriptor block 74.

The convert record/document element block 78 reads the file data record from the output record storage 76, and converts data of the respective data items of the file data records into document element data according to the conversion table 84 for data/character code. For example, numeric data "396" in a file data record is converted to a character string "396" to be positioned at a predetermined location in a predetermined document for display.

The position of the document elements thus converted is determined from the item descriptors for document definition. The system also determines the layout format of the document elements, such as character size, pitch, layout (e.g., right justification for numerals, centering for character string), according to the layout data defined by the item descriptors, if any, or according to default rules if no layout data is definded in the item descriptors, as in the present example. The color of the characters may be set to the same color (black) as that of the ordinary writings. A pointer to a document element (character string data) is set in each cell descriptor (FIG. 29) corresponding to each data entry cell.

The document element records created by the convert record/document element block 78 are set in the document element storage 38 (specifically, corresponding document element data areas 38 (i)) together with the original document elements that have been recorded in the document.

The output document image block 40 reads all document element records corresponding to the ordinary writings (black) from the document element data areas 38 (i), converts the document element records into document element patterns according to the character/graphical pattern dictionary 36, and composes the document element records into a bit mapped image according to the image scanning program. Thus, it may present, on the display screen 20a, for example, an object output document, such as the one shown in FIG. 52. The object output document may also be printed by the printer 22, or transmitted by the facsimile communication equipment 24.

With the present system, users can easily make or set up any desired document definition by simply adding, to a desired document sheet, familiar written signs, characters, symbols or graphicals for helping or enabling the document definition according to predetermined association (syntax) rules. The definition setting operation is very easy for users to learn and involves very few matters to be learned.

The common item definition feature of the present system allows users to define any of the data, file and document by the same or common operation and with the common knowledge. Thus, any concerned operators, ranging from system operators to end users, can easily take part in data definition, file definition and/or document definition.

The described data output processing has been applied to data which is output from a file to a document. The data output processing can also be applied to data which is input from a document to file or data which is transferred between documents.

The above-mentioned data command descriptor of the document is illustrative only. Various commands can be defined using written signs for common, command/procedure descriptor elements, etc.

Figure 53:
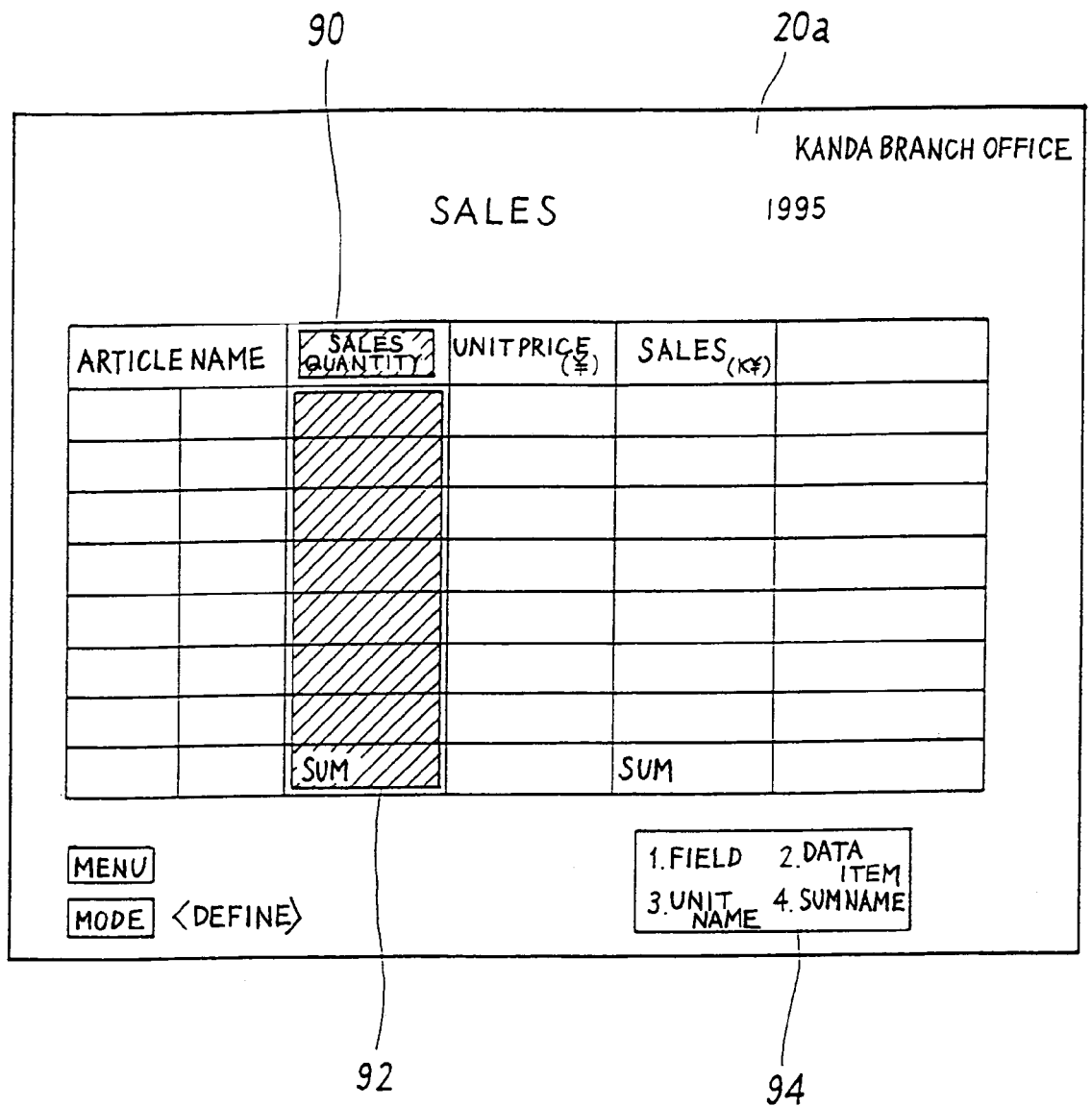
FIG. 53 is a view of a screen in which descriptors are entered using commands in accordance with the system of the embodiment.

The primary features of the present embodiment have been described. Various modifications can be made. FIG. 53 illustrates a modification in which definition data are entered by commands from a display screen. As shown in FIG. 53, the display screen 20a presents contents of a source document. In such a presentation, a user enters desired commands by the keyboard 12, mouse or the like, thus entering desired definition data.

In FIG. 53, when an ordinary writing "SALES QUANTITY" is selected and clicked in a definition mode, for example, the selected area 90 is distinctively displayed (e.g., a reverse display). At the same time, there appears, on the display screen 20a, a sub screen or window 94 which presents a list of definition items, such as 1. FIELD, 2. DATA ITEM, 3. UNIT NAME, etc. Then, if 2. DATA ITEM is selected, the ordinary writing "SALES QUANTITY" is defined as data item of "SALES QUANTITY." Similarly, if an area 92 below the cell "SALES QUANTITY" is selected and clicked, and "1. FIELD" is selected for the area 92, the area 92 is defined as a field for receiving data of "SALES QUANTITY."

In FIG. 53, the data item domain 90 and field domain 92 are shown as if they were selected simultaneously for convenience of illustration. Actually, however, a single area or domain is selected at one time for each click.

In response to such user's operation, the recognize and execute command block 62 in the system analyzes the entered command. The recognize and execute command block 62 repeats matching a clicked display position (object location) of the command against location data of document element records stored in the document element file 38, thus identifying or picking an appropriate document element record in the file 38. Then, the recognize and execute command block 62 creates a required definition descriptor from the identified document element record and contents of the entered command.

The method of adding written signs for helping or enabling document definition can be realized in various ways. In FIG. 14, for example, each data item character string ("DATA ITEM NAME", "TYPE", etc.) is surrounded by a blue colored written sign "O" for DESIGNATE DESCRIPTOR ELEMENT to define it as data item name. In contrast, in FIG. 54, the title "DATA DEFINITION" is surrounded by "O" for DESIGNATE DESCRIPTOR ELEMENT. With this, the table containing a group of data item names or item descriptors can be defined as the one for data definition. To this end, the written sign or character string "DATA DEFINITION" must be registered in a predetermined dictionary (e.g., the descriptor element specifier storage 48) as an entry term which enables branching to step S3 from step S2 in the routine illustrated by FIG. 32. If the entry term ordinary writing has not been recorded in the document, a user may simply write the entry term in blue near the table without needing to surround the entry term by "O" for DESIGNATE DESCRIPTOR ELEMENT.

When it has found a specific entry term (e.g., "DATA DEFINITION") which is either specified by "O" for DESIGNATE DESCRIPTOR ELEMENT or written in blue, the system checks if the entry term has a predetermined association with (positioned near or connected by link to) the table containing a group of item descriptors. If there is such a predetermined association, the system regards the table as the one for data definition, and interprets or recognizes data definition descriptors in the manner as described.

In another modification, on the condition that there is a designation of an item and domain by "< >", "[ ]" or the like with or without the presence or designation of the entry term, the system may regard a table which includes a group of item descriptors having data item names for data definition as the one for data definition according to a predetermined agreement with users, and the system interprets data definition descriptors in the manner as described.

The invention uses programs or software for implementing the features of the invention. The software may be installed in a system of the invention by any medium on which the software is recorded or by an on-line system. Therefore, selling a medium in which the software of the invention is recorded or on-line installing the software into a system may constitute practice of the invention.

What is claimed is:

1. A method for managing data with a document, said method for use in an information processing apparatus, and said method comprising:
   recognizing a first specific kind of sign among written information in a document, the sign designating a second sign or word written in the document to be interpreted as a command name which requests the information processing apparatus to execute a corresponding action or process;
   recognizing in the document the second sign or word to which the first sign is appended;
   interpreting, by using a dictionary table, the recognized second sign or word so as to generate a corresponding command descriptor data for data management; and
   executing a data management task in accordance with the command descriptor data.

2. The method according to claim 1, wherein a third sign written in the document designates a fourth sign or word written in the document as an operand name related to the command, and wherein
   said method further comprises:
   correlating the operand name with the command name; and
   interpreting the fourth sign or word as the operand name of the command descriptor data so as to create operand data corresponding to the command descriptor data.

3. The method according to claim 2, wherein the operand name is designated as a data name associated with a data item name.

4. The method according to claim 3, wherein the first sign is provided with at least one of a first symbol, a first graphical and a first graphic character to be designated as a first term which is requested to be searched for in the dictionary table, and the second sign or word is provided with at least one of a second symbol, a second graphical and a second graphic character to be designated as the operand name related to the command.

5. The method according to claim 2, further comprising:
recognizing, at a predetermined position adjacent to a data name, a term registered in the dictionary table as a descriptor for designating a part of the operand; and
determining the part of the operand in the command descriptor.

6. The method according to claim 1, further comprising recognizing, as an operand descriptor, other descriptor data on a same sheet or page where the command name or a statement is written when there exits no explicit descriptor information which specifies an operand.

7. An apparatus for information processing, said apparatus comprising:
a first recognizing device operable to recognize a first specific kind of sign among written information in a document, the sign designating a second sign or word written in the document to be interpreted as a command name which requests said apparatus to execute a corresponding action or process;
a second recognizing device operable to recognize in the document the second sign or word to which the first sign is appended;
a first interpreting device operable to interpret, by using a dictionary table, the second sign or word recognized by said second recognizing device so as to generate a corresponding command descriptor data for data management; and a first executing device operable to execute a data management task in accordance with the command descriptor data.

8. The apparatus according to claim 7, wherein a third sign written in the document designates a fourth sign or word written in the document as an operand name related to the command, and wherein
said apparatus further comprises:
a correlating device operable to correlate the operand name with the command name; and
a second interpreting device operable to interpret the fourth sign or word as the operand name of the command descriptor data so as to create operand data corresponding to the command descriptor data.

9. The apparatus according to claim 8, wherein the operand name is designated as a data name associated with a data item name.

10. The apparatus according to claim 9, wherein the first sign is provided with at least one of a first symbol, a first graphical and a first graphic character to be designated by the descriptor information as a term which is requested to be searched for in the dictionary table, and the second sign or word is provided with at least one of a second symbol, a second graphical and a second graphic characteristic to be designated by descriptor information as the operand name related to the command.

11. The apparatus according to claim 8, further comprising:
a third recognizing device operable to recognize, at a predetermined position adjacent to a data name, a term registered in the dictionary table as a descriptor designating a part of an operand; and
a determining device operable to determine the part of the operand in the command descriptor.

12. The apparatus according to claim 7, further comprising a third recognizing device operable to recognize, as an operand descriptor, other descriptor data on a same sheet or page where the command name or a statement is written when there exists no explicit descriptor information which specifies an operand.

13. A computer-readable medium encoded with a computer program for causing a computer to perform data management with a document, said computer readable medium comprising:
computer readable program code operable to allow recognition of a first specific kind of sign among written information in a document, the sign designating a second sign or word written in the document to be interpreted as a command name which requests the computer to execute a corresponding action or process;
computer readable program code operable to allow recognition of the second sign or word to which the first sign is appended;
computer readable program code operable to allow interpretation of the recognized second sign, by using a dictionary table, so as to generate a corresponding command descriptor data for data management; and
computer readable program code operable to all execution of a data management task in accordance with the command descriptor data.

* * * * *